(12) United States Patent
Kurihara et al.

(10) Patent No.: US 9,800,649 B2
(45) Date of Patent: Oct. 24, 2017

(54) DATA COMMUNICATION METHOD AND DATA COMMUNICATION SYSTEM

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Yokohama (JP); Hiromasa Yamauchi, Usakos (NA); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 656 days.

(21) Appl. No.: 14/095,167

(22) Filed: Dec. 3, 2013

(65) Prior Publication Data

US 2014/0095573 A1 Apr. 3, 2014

Related U.S. Application Data

(63) Continuation of application No. PCT/JP2011/062982, filed on Jun. 6, 2011.

(51) Int. Cl.
*G06F 15/16* (2006.01)
*H04L 29/08* (2006.01)
(Continued)

(52) U.S. Cl.
CPC .......... *H04L 67/10* (2013.01); *H04L 67/1095* (2013.01); *H04L 67/2838* (2013.01); *H04W 4/08* (2013.01); *H04W 4/18* (2013.01)

(58) Field of Classification Search
CPC ...... H04W 4/08; H04W 4/18; H04L 67/2838; H04L 67/1095; H04L 67/10
See application file for complete search history.

(56) References Cited

U.S. PATENT DOCUMENTS 6,842,460 B1 * 1/2005 Olkkonen ............. H04W 48/16 370/328
8,156,497 B2 * 4/2012 Abernethy, Jr. ....... G06Q 10/06 718/102

(Continued)

FOREIGN PATENT DOCUMENTS

| JP | 2007-336360 | 12/2007 |
|---|---|---|
| JP | 2008-72711 | 3/2008 |
| JP | 2009-294721 | 12/2009 |

OTHER PUBLICATIONS

Japanese Office Action dated Nov. 18, 2014 in corresponding Japanese Patent Application No. 2013-519252.

(Continued)

*Primary Examiner* — Cheikh Ndiaye
(74) *Attorney, Agent, or Firm* — Staas & Halsey LLP

(57) ABSTRACT

A data communication method includes registering as a group and by a first data processing device of plural data processing devices, at least one second data processing device capable of communicating with the first data processing device; transmitting by the first data processing device and to the data processing devices, a first reception request for data; transmitting by the first data processing device and to the at least one second data processing device, a second reception request for the data when there is no response to the first reception request from the first data processing devices; and transmitting the data to the second data processing device, by the first data processing device and based on a response from the second data processing device.

8 Claims, 23 Drawing Sheets

(51) Int. Cl.
*H04W 4/08* (2009.01)
*H04W 4/18* (2009.01)

(56) References Cited

U.S. PATENT DOCUMENTS

| | | | | |
|---|---|---|---|---|
| 8,180,924 | B2* | 5/2012 | Shiraishi | G06F 3/1204 |
| | | | | 358/1.13 |
| 2007/0160004 | A1 | 7/2007 | Sakhpara | |
| 2009/0182859 | A1* | 7/2009 | Motoyama | H04W 48/14 |
| | | | | 709/223 |
| 2010/0315261 | A1* | 12/2010 | Rutjes | H04L 12/66 |
| | | | | 340/9.1 |
| 2011/0093593 | A1* | 4/2011 | Shirakata | H04L 63/08 |
| | | | | 709/225 |

OTHER PUBLICATIONS

International Search Report mailed Jul. 19, 2011 in corresponding International Application No. PCT/JP2011/062982.
PCT International Preliminary Report on Patentability mailed Dec. 27, 2013 in corresponding International Application No. PCT/JP2011/062982.

* cited by examiner

| SUPPORT TERMINAL GROUP INFORMATION | |
|---|---|
| GROUP PROCESSING TERMINAL ID | CONNECTED TERMINAL ID (SUPPORT TERMINAL) |
| A | D, E |
| B | F, G, H |
| C | I, J, K |

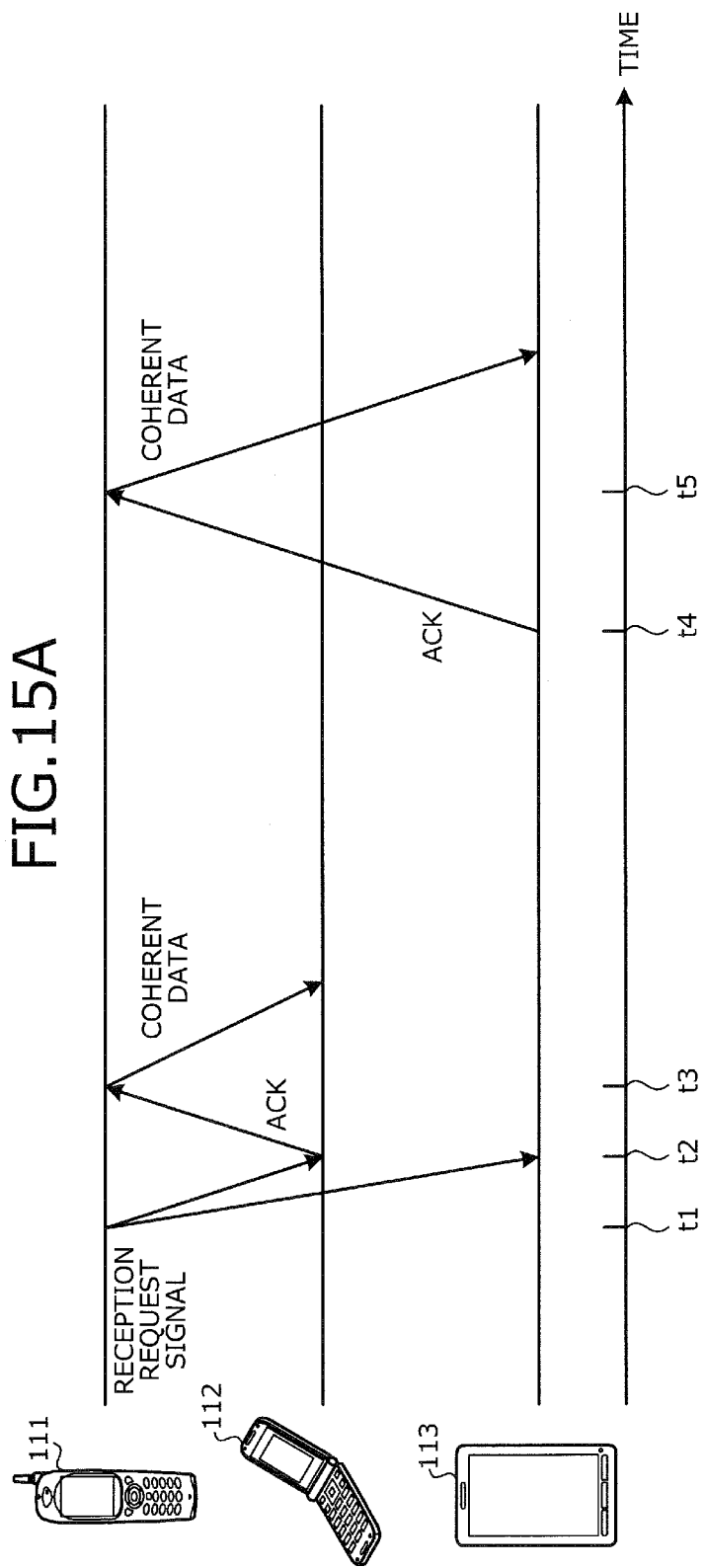

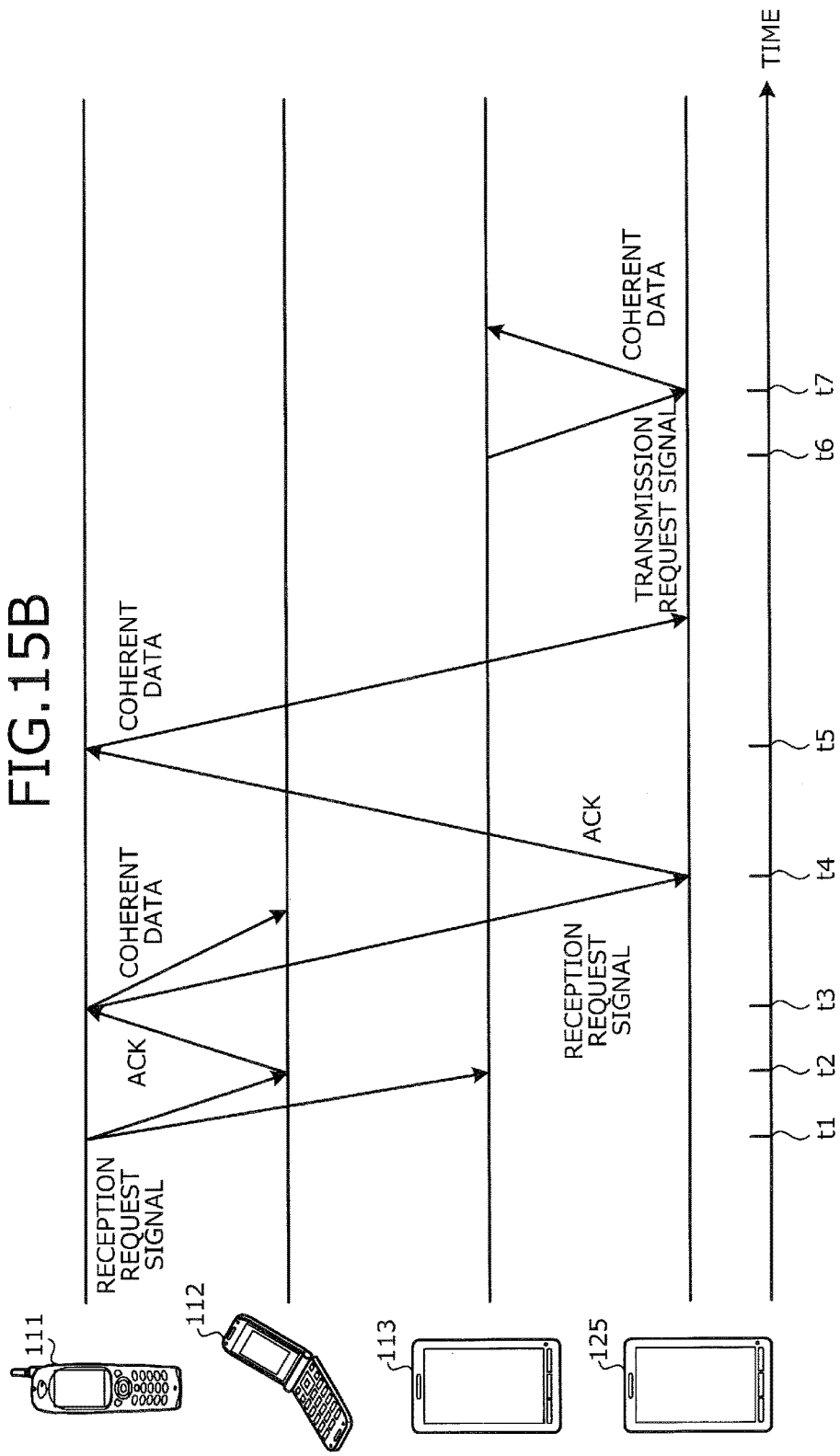

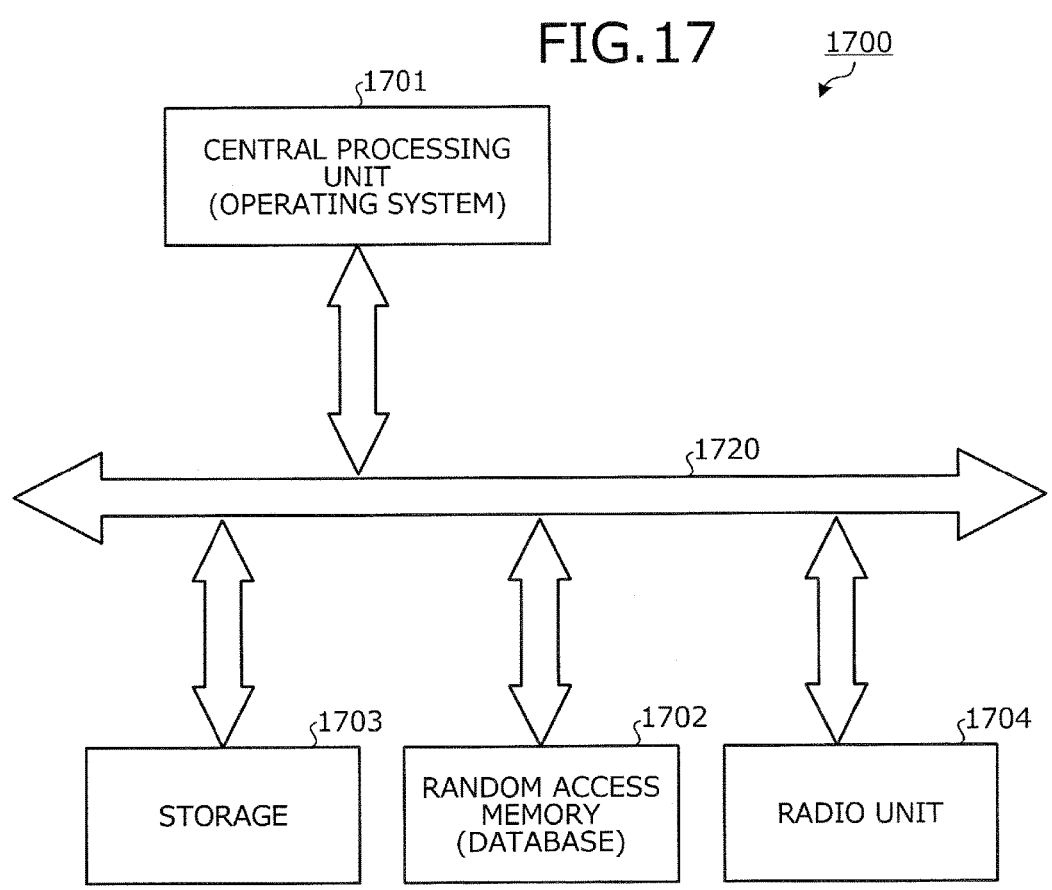

DATA COMMUNICATION METHOD AND DATA COMMUNICATION SYSTEM

CROSS REFERENCE TO RELATED APPLICATIONS

This application is a continuation application of International Application PCT/JP2011/062982, filed on Jun. 6, 2011 and designating the U.S., the entire contents of which are incorporated herein by reference.

FIELD

The embodiment discussed herein is related to a data communication method and a data communication system.

BACKGROUND

Group processing is known that distributes predetermined processes to plural terminals (see, e.g., Japanese Laid-Open Patent Publication Nos. 2007-336360 and 2008-72711). When performing the group processing, for example, a data coherency process is performed with respect to resources shared by the plural terminals, whereby coherency among data (caches) retained by the terminals is established. In performing the data coherency process, for example, broadcast communication is used to transmit the data retained by one terminal to other terminals.

With conventional technologies described above, however, when there is a terminal that cannot immediately receive the data transmitted by the broadcast communication, the broadcast communication is difficult to complete and the data coherency process takes time. Consequently, a problem arises in that group processing cannot be performed efficiently.

SUMMARY

According to an aspect of an embodiment, a data communication method includes registering as a group and by a first data processing device of plural data processing devices, at least one second data processing device capable of communicating with the first data processing device; transmitting by the first data processing device and to the data processing devices, a first reception request for data; transmitting by the first data processing device and to the at least one second data processing device, a second reception request for the data when there is no response to the first reception request from the first data processing devices; and transmitting the data to the second data processing device, by the first data processing device and based on a response from the second data processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram depicting one example of support terminal group information;

FIG. 15A is a reference diagram of one example of operation of the communication system on an assumption that the support terminals are not used;

FIG. 15B is a diagram depicting one example of the communication system using the support terminals;

FIG. 17 is a diagram depicting one example of a hardware configuration of the group processing terminal and the support terminal;

DESCRIPTION OF EMBODIMENTS

Embodiments of a data communication method and a data communication system will be described in detail with reference to the accompanying drawings.

Figure 1:
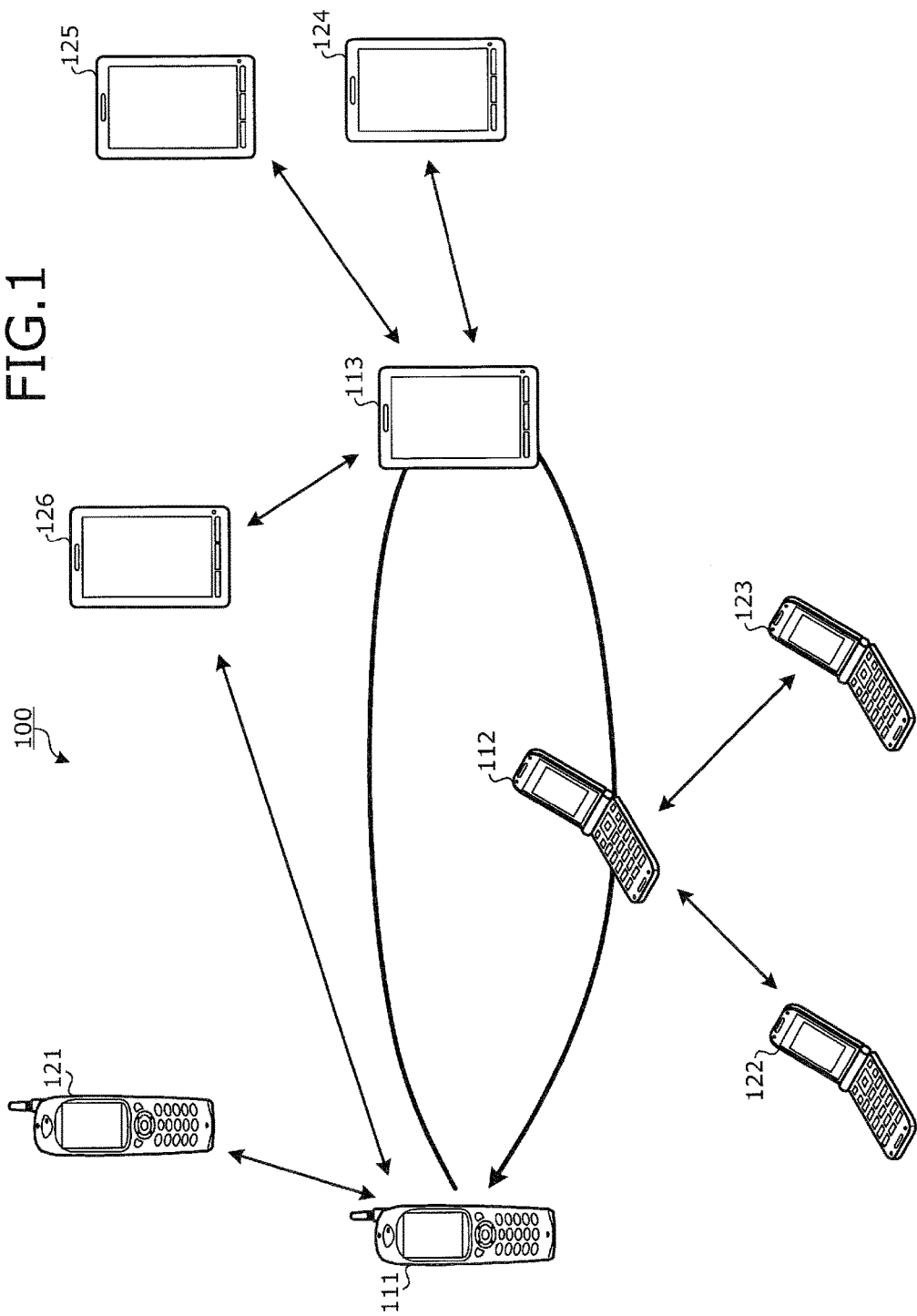
FIG. 1 is a diagram depicting a communication system according to an embodiment.

FIG. 1 depicts a communication system according to an embodiment. As depicted in FIG. 1, a communication system 100 according the embodiment includes terminals 111 to 113 and the terminals 121 to 126. The terminals 111 to 113 and the terminals 121 to 126 are data processing devices capable of radio communication with one another by, for example, the ad hoc communication, etc.

In the example depicted in FIG. 1, the terminals 111 to 113 are a group of group processing terminals that are connected to one another by radio communication and that perform group processing in which process is distributed among the terminals 111 to 113. Each of the terminals 111 to 113 establishes connections with connectable surrounding terminals at the time of execution (e.g., at the time of starting) of the group processing.

In the example of FIG. 1, the terminal 111 connects with the terminals 121 and 126. The terminal 112 connects with the terminals 122 and 123. The terminal 113 connects with the terminals 124 to 126. In this case, the terminals 121 to 126 become a support terminal group that supports the group processing of the terminals 111 to 113. In the following description, the terminals 111 to 113 are referred to as group processing terminals 111 to 113, respectively and the terminals 121 to 126 are referred to as support terminals 121 to 126, respectively.

The group processing terminals 111 to 113 perform with respect to resources to be shared in the group processing, a data coherency process that establishes coherency of the data (caches) retained by the group processing terminals 111 to 113. For example, the group processing terminals 111 to 113 perform the data coherency process by transmitting and receiving coherent data through broadcast communication among the group processing terminals 111 to 113.

As depicted in FIG. 1, at least one support terminal 121 to 126 (second data processing device) capable of communicating with the group processing terminal 113 (first data processing device) among the group processing terminals 111 to 113 (plural data processing devices) is registered as the support terminal group (group).

Figure 2:
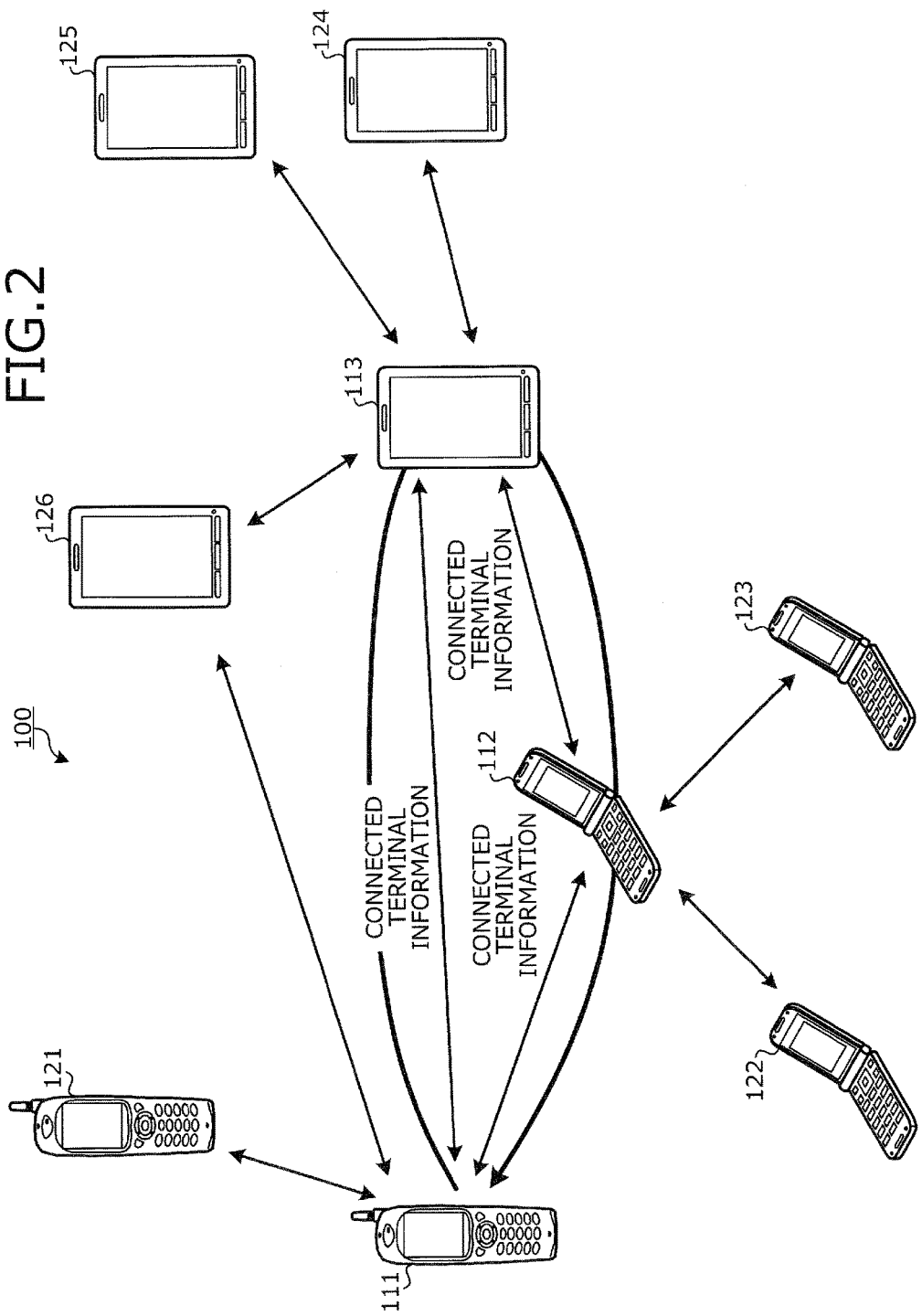
FIG. 2 is a diagram depicting sharing of support terminal group information by group processing terminals.

FIG. 2 depicts sharing of support terminal group information by the group processing terminals. In FIG. 2, parts identical to those depicted in FIG. 1 are given the same reference numerals used in FIG. 1, and the description thereof is omitted. Support terminal group information that indicates the support terminals 121 to 126 is shared. For example, the group processing terminals 111 to 113 transmit to and receive from one another, connected terminal information that indicates the support terminals connected to respective terminals, among the support terminals 121 to 126.

Each of the group processing terminals 111 to 113 prepares and stores in memory of the terminal, the support terminal group information including the support terminals connected to the terminal and the support terminals indicated by the received connected terminal information. This enables the group processing terminals 111 to 113 to share the support terminal group information, which indicates the support terminal group (support terminals 121 to 126) connected to at least any of the group processing terminals 111 to 113.

FIG. 3 depicts one example of the support terminal group information. Support terminal group information 300 depicted in FIG. 3 is one example of the support terminal group information to be shared by the group processing terminals 111 to 113. In the support terminal group information 300, a connected terminal ID indicative of the terminal (support terminal) connected to the group processing terminal 111 to 113 is mapped to each group processing terminal ID indicative of the group processing terminal 111 to 113.

Thus, the support terminal group information 300 includes, for example, information that indicates the support terminal group (support terminals 121 to 126) and information that indicates a connection relationship between each support terminal and the group processing terminal (group processing terminal 111 to 113).

Figure 4:
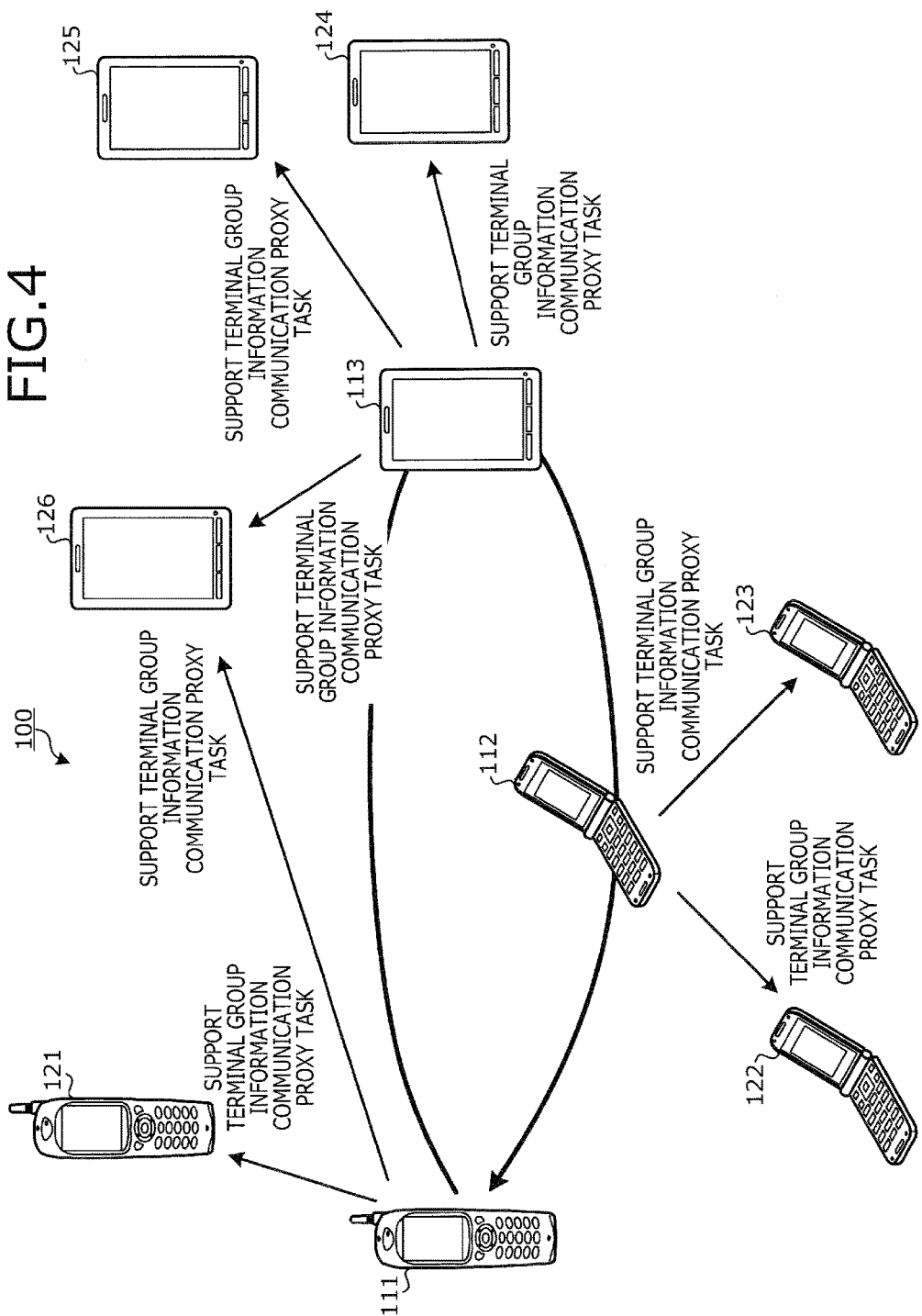
FIG. 4 is a diagram depicting distribution of the support terminal group information and a communication proxy task.

FIG. 4 depicts distribution of the support terminal group information and a communication proxy task. In FIG. 4, parts identical to those depicted in FIG. 1 are given the same reference numerals used in FIG. 1, and the description thereof is omitted. As depicted in FIG. 4, each of the group processing terminals 111 to 113 transmits the support terminal group information and the communication proxy task to the support terminals connected to the terminal, thereby enabling distribution of the support terminal group information and the communication proxy task to the support terminals 121 to 126.

The support terminal group information is information that indicates the support terminals 121 to 126 (see, e.g., FIG. 3). The communication proxy task is information that requests reception of the coherent data by proxy in the broadcast communication by the group processing terminals 111 to 113. When there are plural support terminals (second data processing devices) registered as the support terminals (group), the communication proxy task instructs the plural support terminals to share the data.

Each of the support terminals 121 to 126 receives the support terminal group information and the communication proxy task from the group processing terminal connected to the terminal, among the group processing terminals 111 to 113. Each of the support terminals 121 to 126 stores the received support terminal group information and communication proxy task to the memory of the terminal, thereby enabling sharing of the support terminal group information among the group processing terminals 111 to 113 and the support terminals 121 to 126, and distribution of the communication proxy task to the support terminals 121 to 126.

Figure 5:
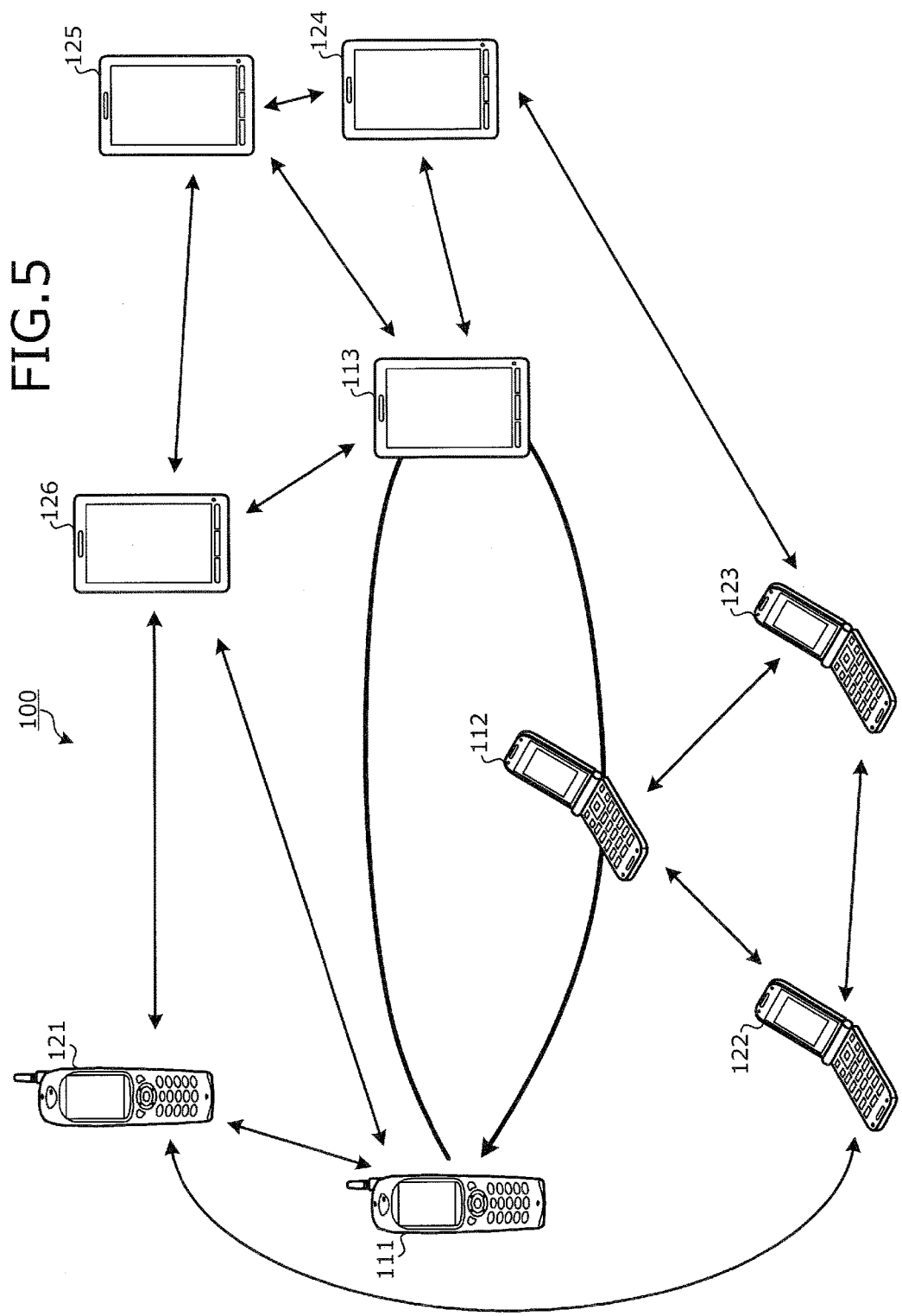
FIG. 5 is a diagram depicting connection among support terminals.

FIG. 5 depicts connection among the support terminals. In FIG. 5, parts identical to those depicted in FIG. 1 are given the same reference numerals used in FIG. 1, and the description thereof is omitted. Upon receipt of the support terminal group information and the communication proxy task, each of the support terminals 121 to 126 identifies the support terminals other than the terminal, based on the received support terminal group information. Each of the support terminals 121 to 126 establishes a connection with the identified support terminals if connectable.

In the example of FIG. 5, the support terminal 121 and the support terminal 122 establish a connection. The support terminal 122 and the support terminal 123 establish a connection. The support terminal 123 and the support terminal 124 establish a connection. The support terminal 124 and the support terminal 125 establish a connection. The support terminal 125 and the support terminal 126 establish a connection. The support terminal 126 and the support terminal 121 establish a connection.

Figure 6:
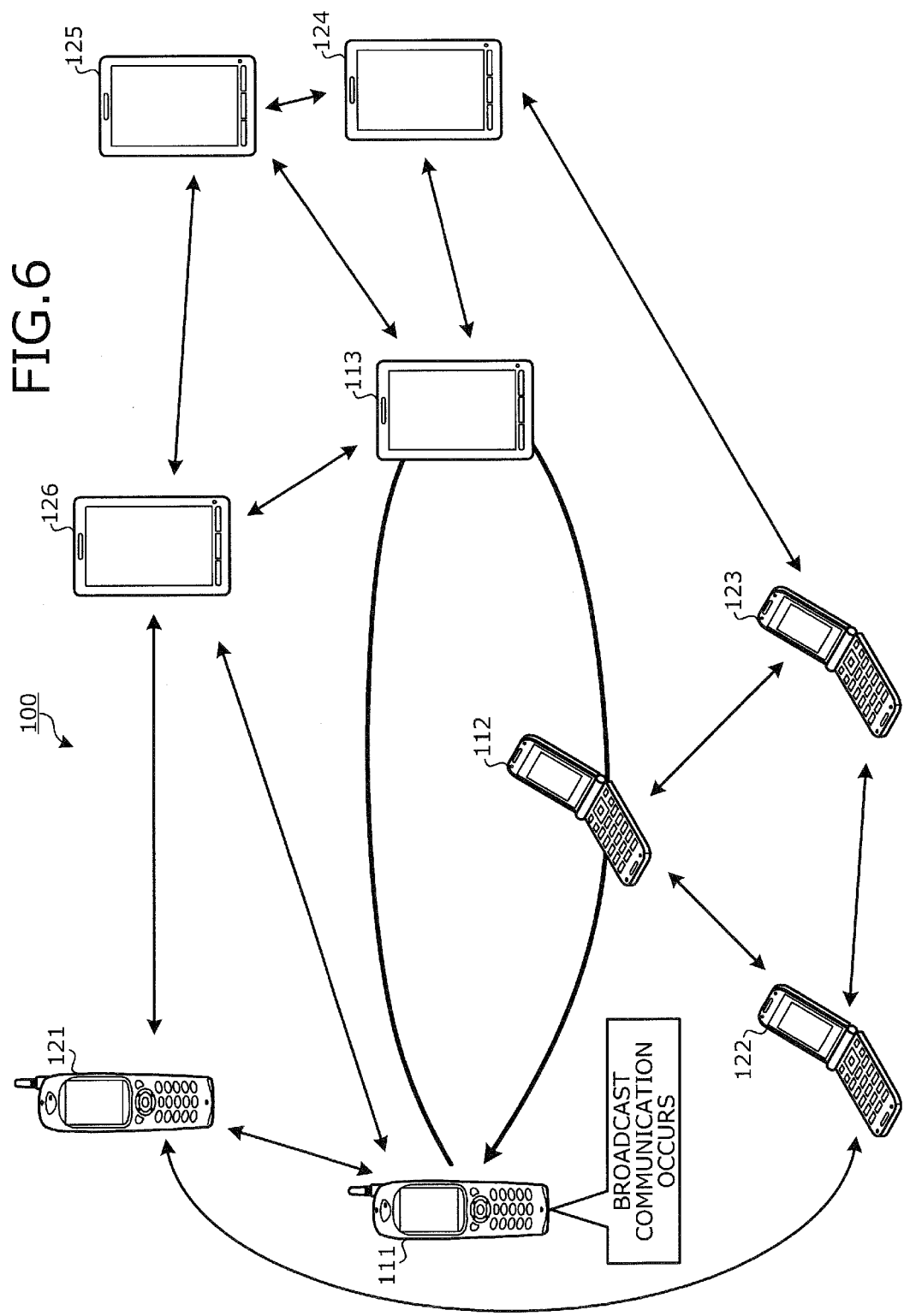
FIG. 6 is a diagram depicting one example of broadcast communication.

FIG. 6 depicts one example of the broadcast communication. In FIG. 6, parts identical to those depicted in FIG. 5 are given the same reference numerals used in FIG. 5, and the description thereof is omitted. It is assumed that at the group processing terminal 111, broadcast communication has occurred to transmit the coherent data in the data coherency process to the group processing terminals 112 and 113.

Figure 7:
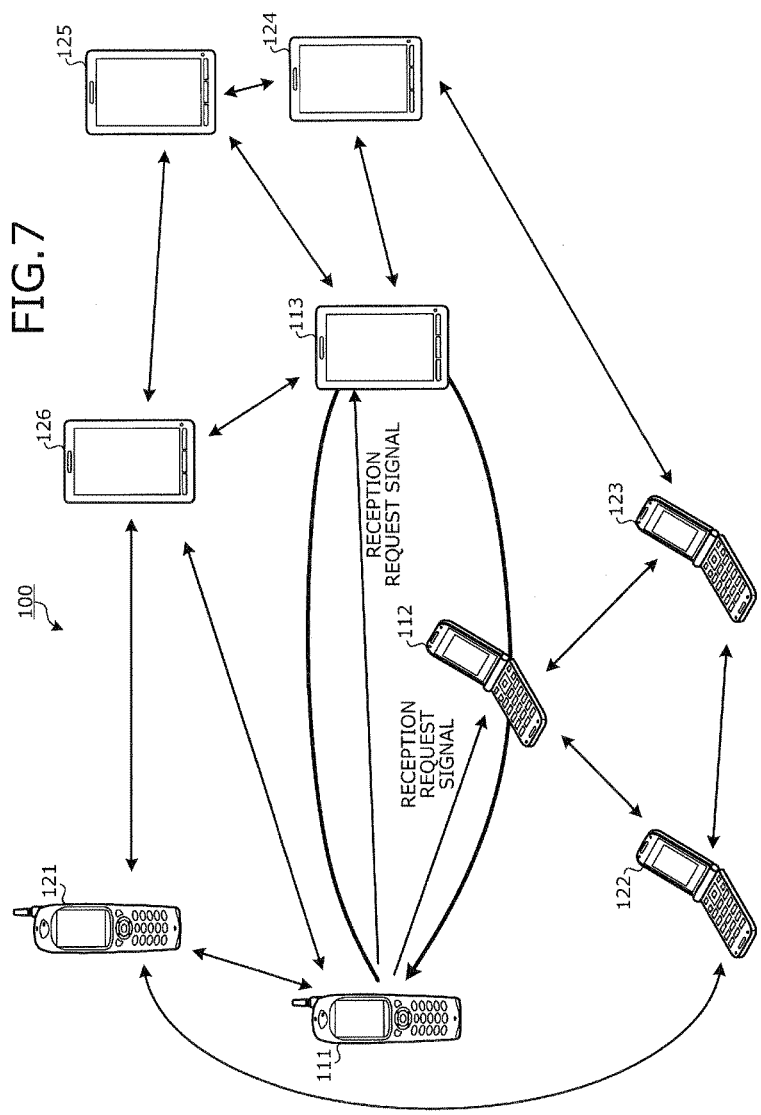
FIG. 7 is a diagram depicting one example of transmission of a reception request signal to the group processing terminals.

FIG. 7 depicts one example of transmission of a reception request signal to the group processing terminals. In FIG. 7, parts identical to those depicted in FIG. 5 are given the same reference numerals, and the description thereof is omitted. As depicted in FIG. 7, the group processing terminal 111 transmits to the group processing terminals 112 and 113, a reception request signal that requests the reception of the coherent data. Thus, the group processing terminal 111, at the time of the broadcast communication with the group processing terminals 112 and 113 (plural data processing devices), transmits a first reception request of the data to the group processing terminals 112 and 113 (plural data processing devices).

Figure 8:
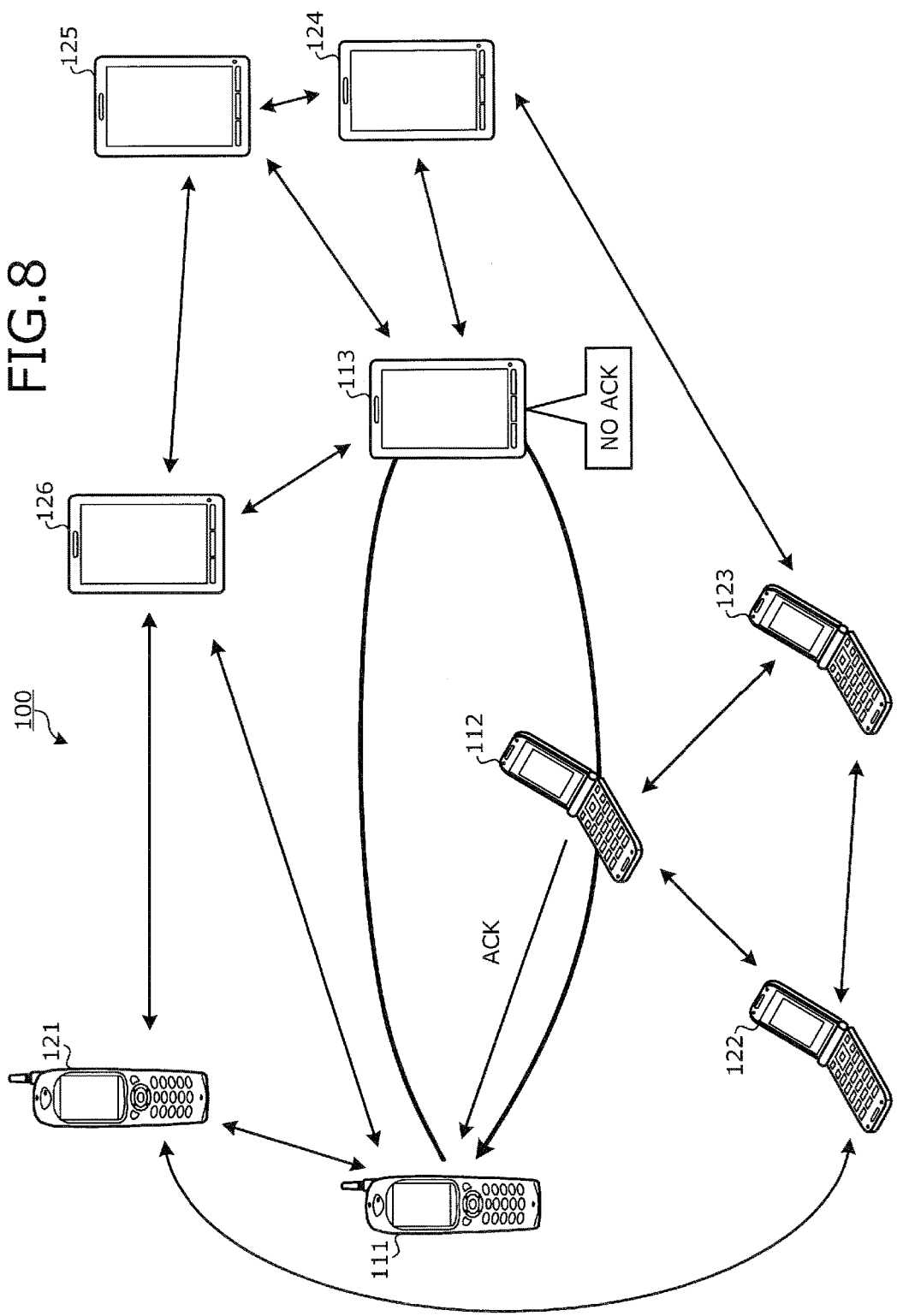
FIG. 8 is a diagram depicting one example of transmission of a response signal from a group processing terminal.

FIG. 8 depicts one example of the transmission of a response signal from the group processing terminal. In FIG. 8, parts identical to those depicted in FIG. 5 are given the same reference numerals used in FIG. 5, and the description thereof is omitted. As depicted in FIG. 8, in response to the reception request signal transmitted from the group processing terminal 111, the group processing terminal 112, which is in the state of being capable of receiving the coherent data, transmits an ACK (response signal) to the group processing terminal 111. On the other hand, the group processing terminal 113 is, for example, processing a task higher of priority than that of the group processing and cannot transmit an ACK to the group processing terminal 111.

Figure 9:
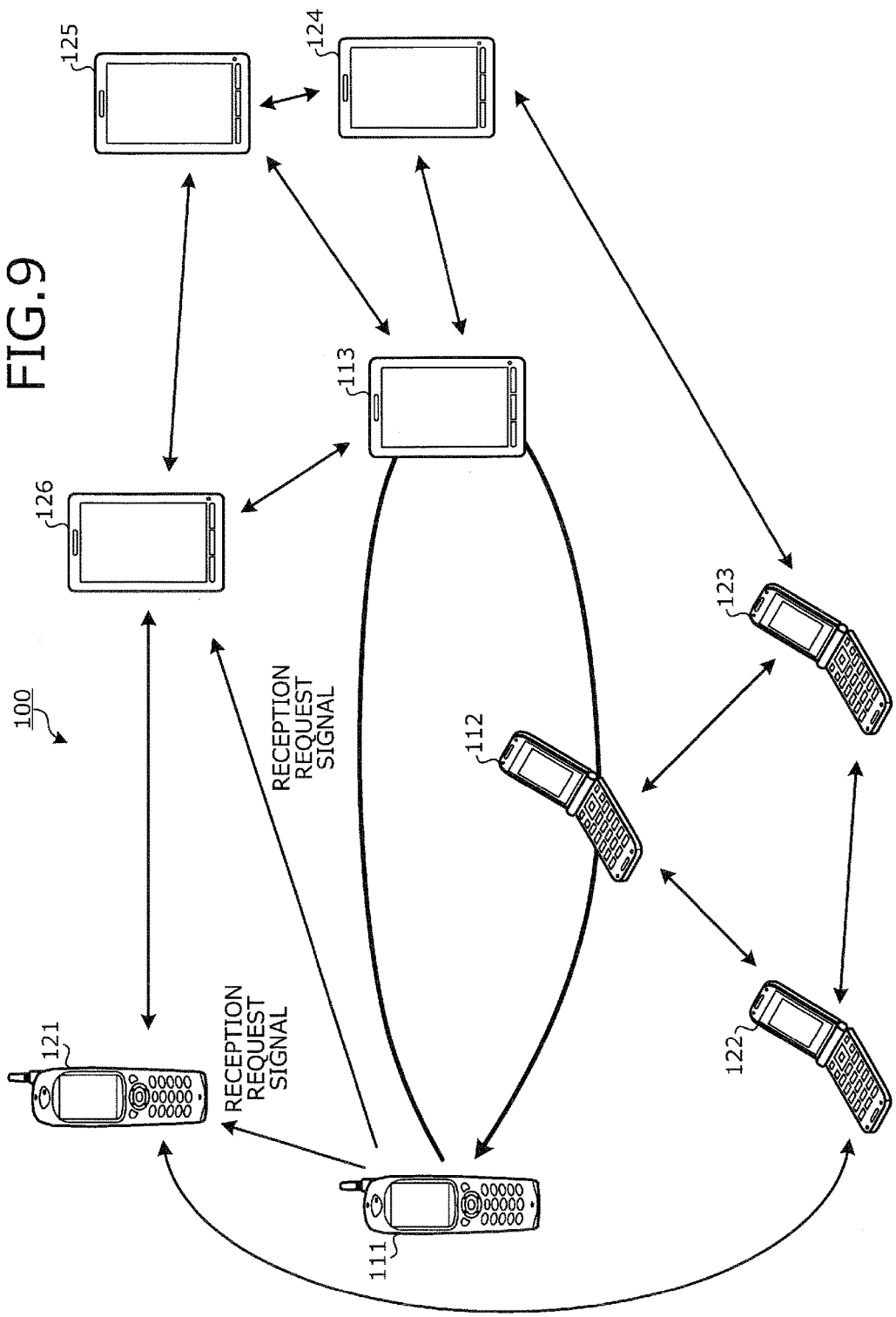
FIG. 9 is a diagram depicting one example of transmission of the reception request signal to the support terminal group.

FIG. 9 depicts one example of transmission of the reception request signal to the support terminal group. In FIG. 9, parts identical to those depicted in FIG. 5 are given the same reference numerals used in FIG. 5, and the description thereof is omitted. As depicted in FIG. 9, consequent to receiving no ACK from the group processing terminal 113, the group processing terminal 111 transmits the reception request signal to the support terminals 121 and 126 connected to the terminal, in the support terminal group. Thus, if there is no response to the first reception request from the group processing terminal 113 (first data processing device), the group processing terminal 111 transmits to the support terminals 121 and 126 (second data processing devices), a second reception request for the data.

Figure 10:
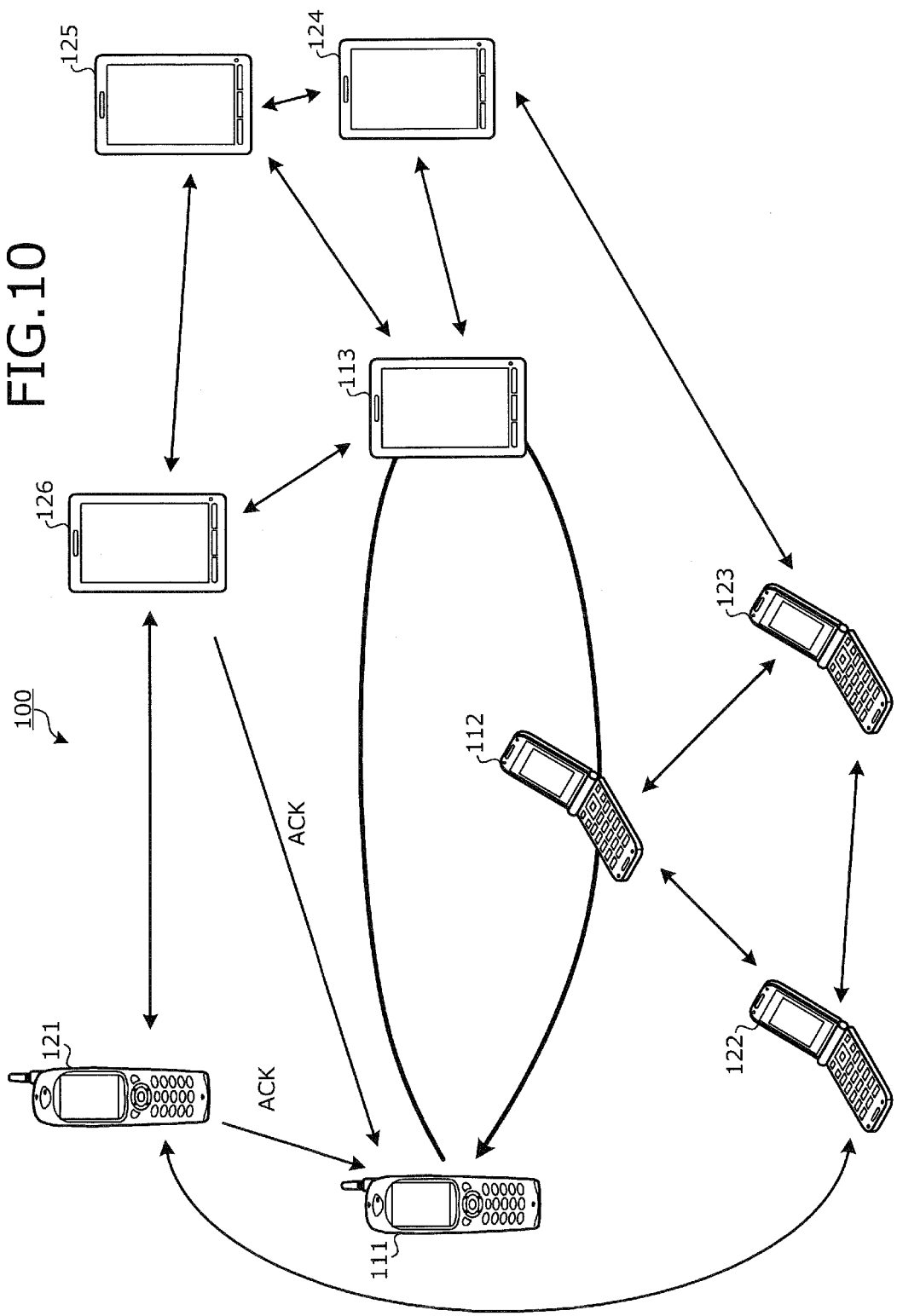
FIG. 10 is a diagram depicting one example of transmission of a response signal from the support terminal group.

FIG. 10 depicts one example of transmission of a response signal from the support terminal group. In FIG. 10, parts identical to those depicted in FIG. 5 are given the same reference numerals used in FIG. 5, and the description thereof is omitted. As depicted in FIG. 10, in response to the reception request signal transmitted from the group processing terminal 111, the support terminals 121 and 126, which are in the state of being capable of receiving the coherent data, transmit an ACK (response signal) to the group processing terminal 111.

Figure 11:
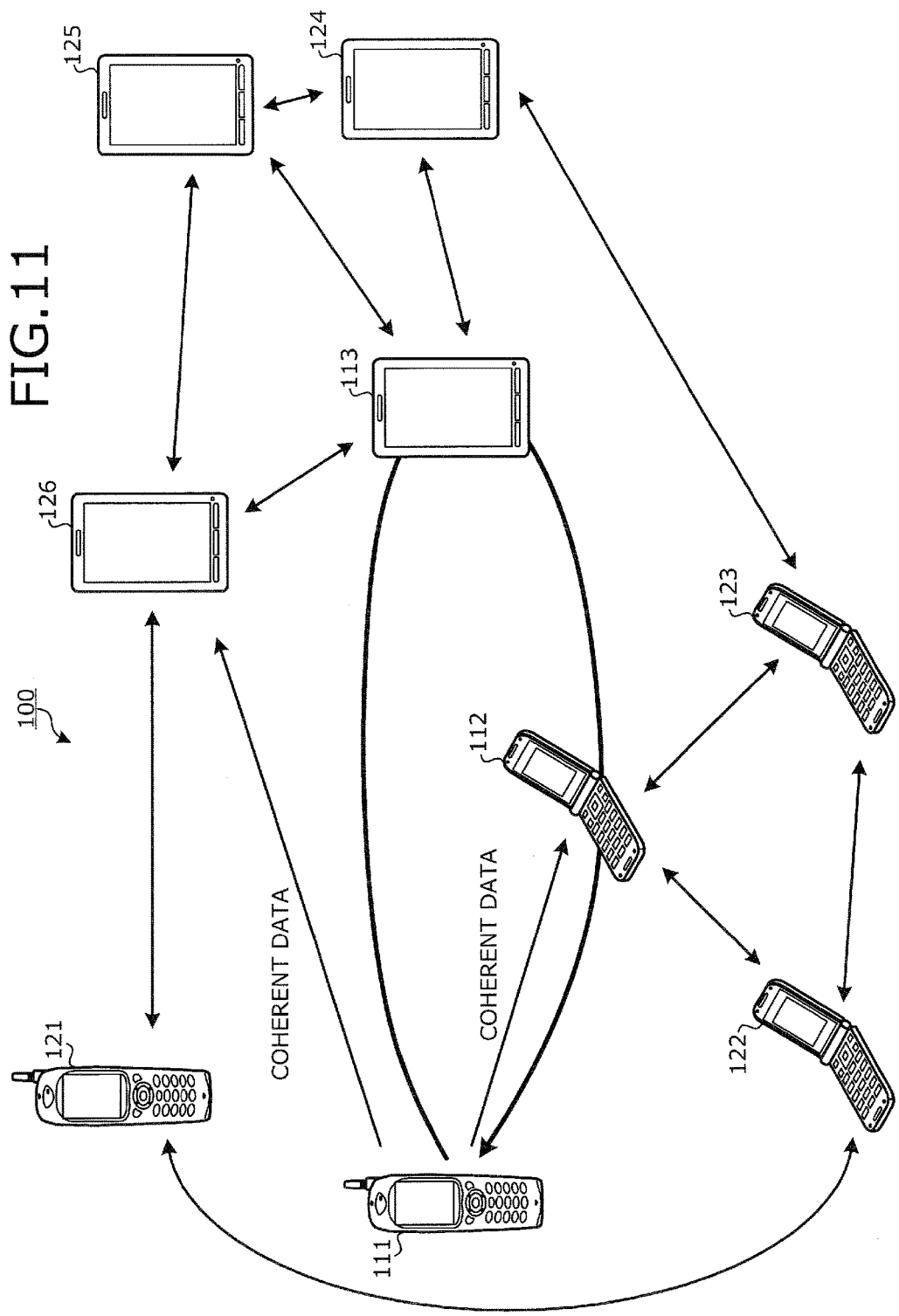
FIG. 11 is a diagram depicting one example of broadcast transmission of coherent data.

FIG. 11 depicts one example of broadcast transmission of the coherent data. In FIG. 11, parts identical to those depicted in FIG. 5 are given the same reference numerals used in FIG. 5, and the description thereof is omitted. As depicted in FIG. 11, the group processing terminal 111 transmits the coherent data to the group processing terminal 112 from which an ACK was received, among the group processing terminals 112 and 113 to which the reception request signal was transmitted.

The group processing terminal 111 transmits the coherent data to be received by the group processing terminal 113 to any one (or all) of the support terminals (support terminals 121 and 126) that transmitted an ACK, among the support terminals 121 and 126 to which the reception request signal was transmitted. The example depicted in FIG. 11 assumes that the group processing terminal 111 transmits the coherent data to the support terminal 126. The support terminal 126 receives as a proxy from the group processing terminal 111, the coherent data to be received by the group processing terminal 113.

Thus, the group processing terminal 111, based on the response from the support terminals 121 and 126 (second data processing devices), transmits the data to the support terminals 121 and 126 (second data processing devices).

Figure 12:
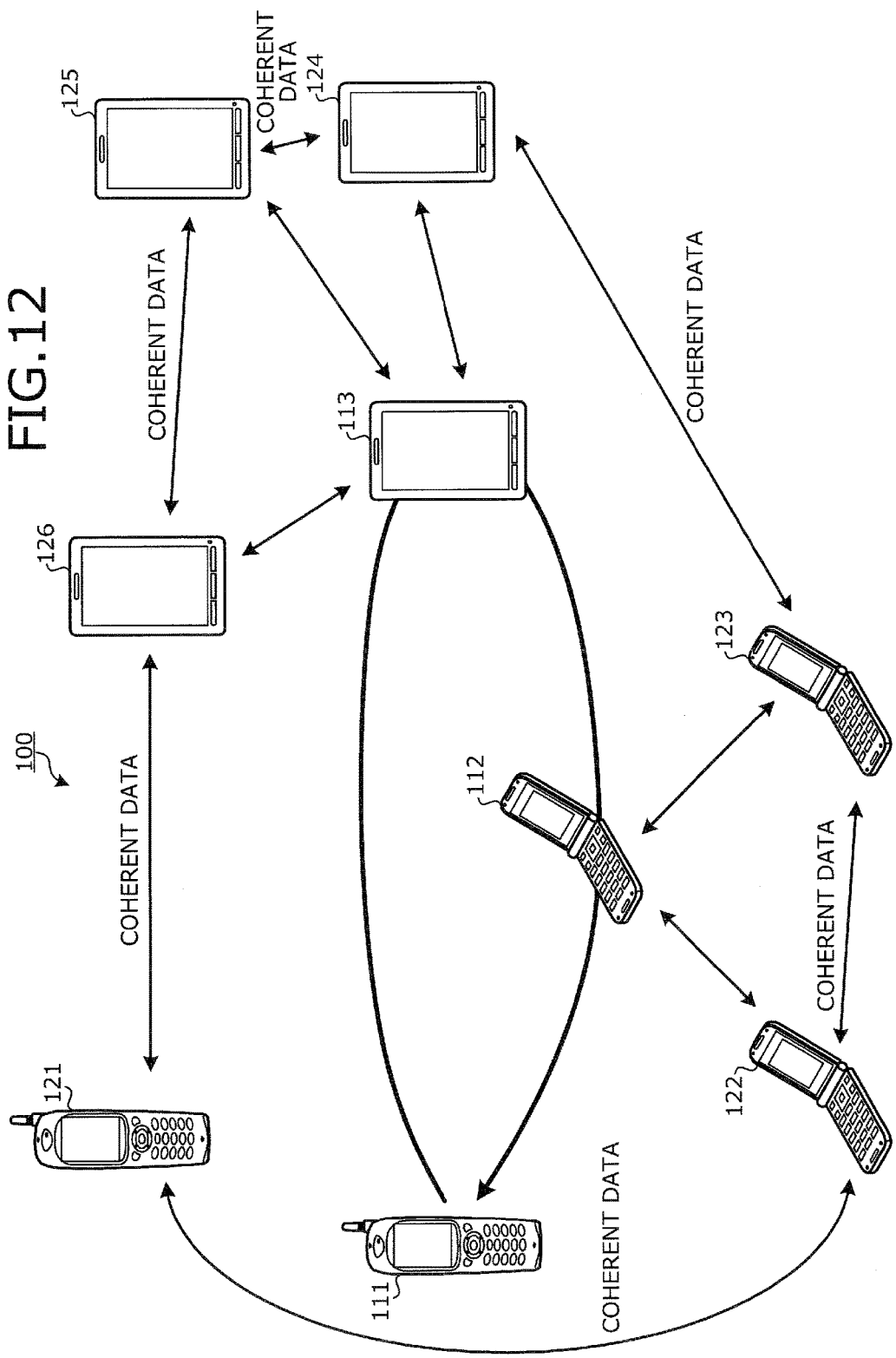
FIG. 12 is a diagram depicting one example of sharing of the coherent data by the support terminal group.

FIG. 12 depicts one example of sharing of the coherent data by the support terminal group. In FIG. 12, parts identical to those depicted in FIG. 5 are given the same reference numerals used in FIG. 5, and the description thereof is omitted. As depicted in FIG. 12, the support terminals 121 to 126 share the coherent data that the support terminals 121 to 126 received as proxies from the group processing terminal 111.

For example, the support terminal 126 stores the coherent data received from the group processing terminal 111 to the memory of the terminal as well as transferring the data to the support terminals 121 and 125 connected to the terminal. Each of the support terminals 121 to 125 stores the coherent data transmitted from the support terminals other than the terminal to the memory of the terminal as well as transfers the data to the support terminals connected to the terminal. This enables the coherent data to be shared by the support terminals 121 to 126.

Thus, when there are plural support terminals (second processing devices) registered as a support terminal group (group), the data is transmitted to the support terminals 121 to 125 (second data processing devices) excluding the support terminal 126 (second data processing device), from the support terminal 126 (second data processing device) to which the data has been transmitted.

Figure 13:
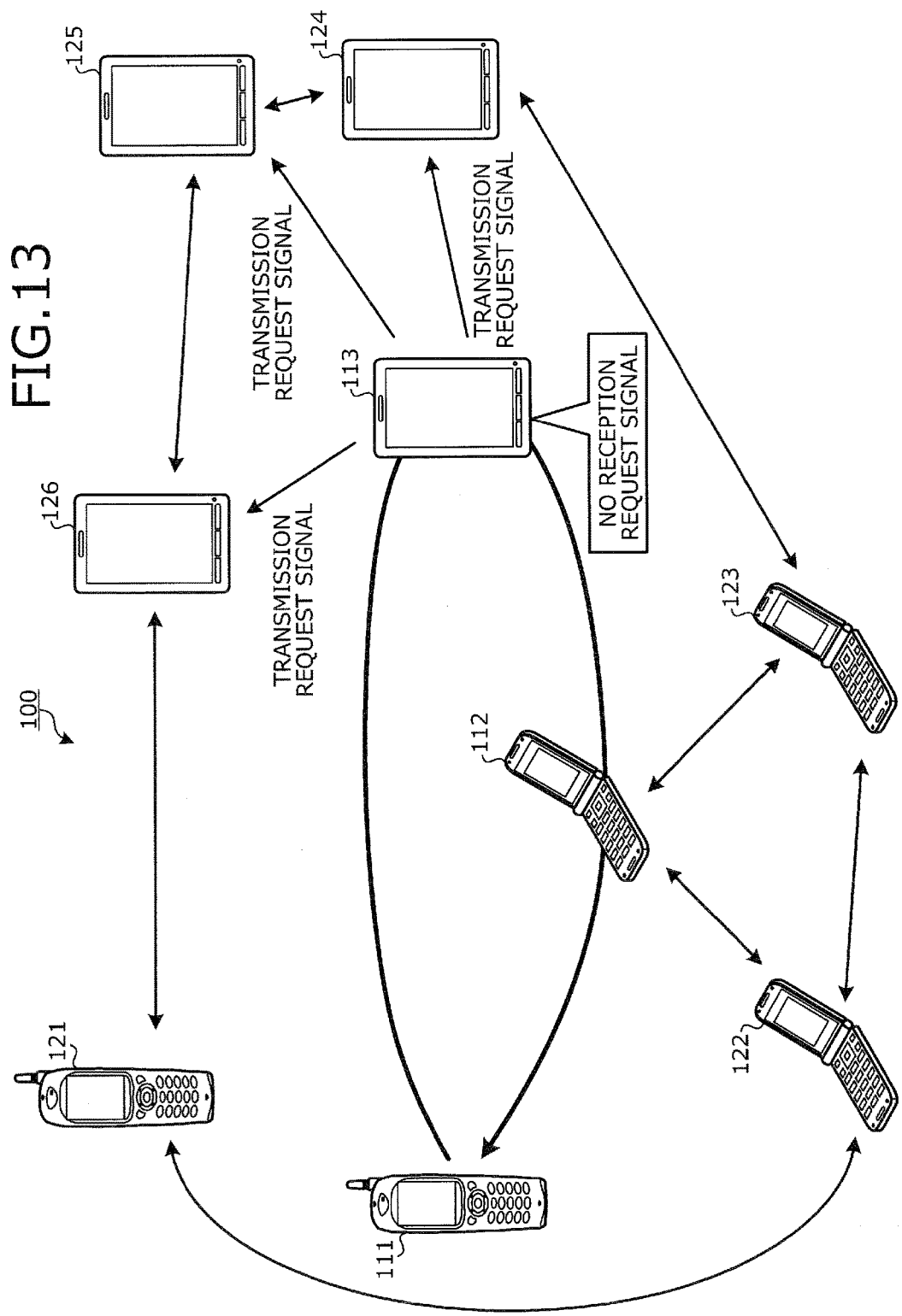
FIG. 13 is a diagram depicting one example of transmission of a transmission request signal from the group processing terminal to the support terminals.

FIG. 13 depicts one example of transmission of a transmission request signal from the group processing terminal to the support terminals. In FIG. 13, parts identical to those depicted in FIG. 5 are given the same reference numerals used in FIG. 5, and the description thereof is omitted. As depicted in FIG. 13, for a given period, the group processing terminal 113 waits for the transmission of a reception request signal from the group processing terminal 111, when a process of the terminal reaches a reception process for broadcast data.

If there is no transmission of a reception request signal from the group processing terminal 111 within the given period, the group processing terminal 113 transmits a transmission request signal to the support terminals 124 to 126 to which the terminal is connected. The transmission request signal is, for example, a signal requesting the transmission of the coherent data received by proxy.

Figure 14:
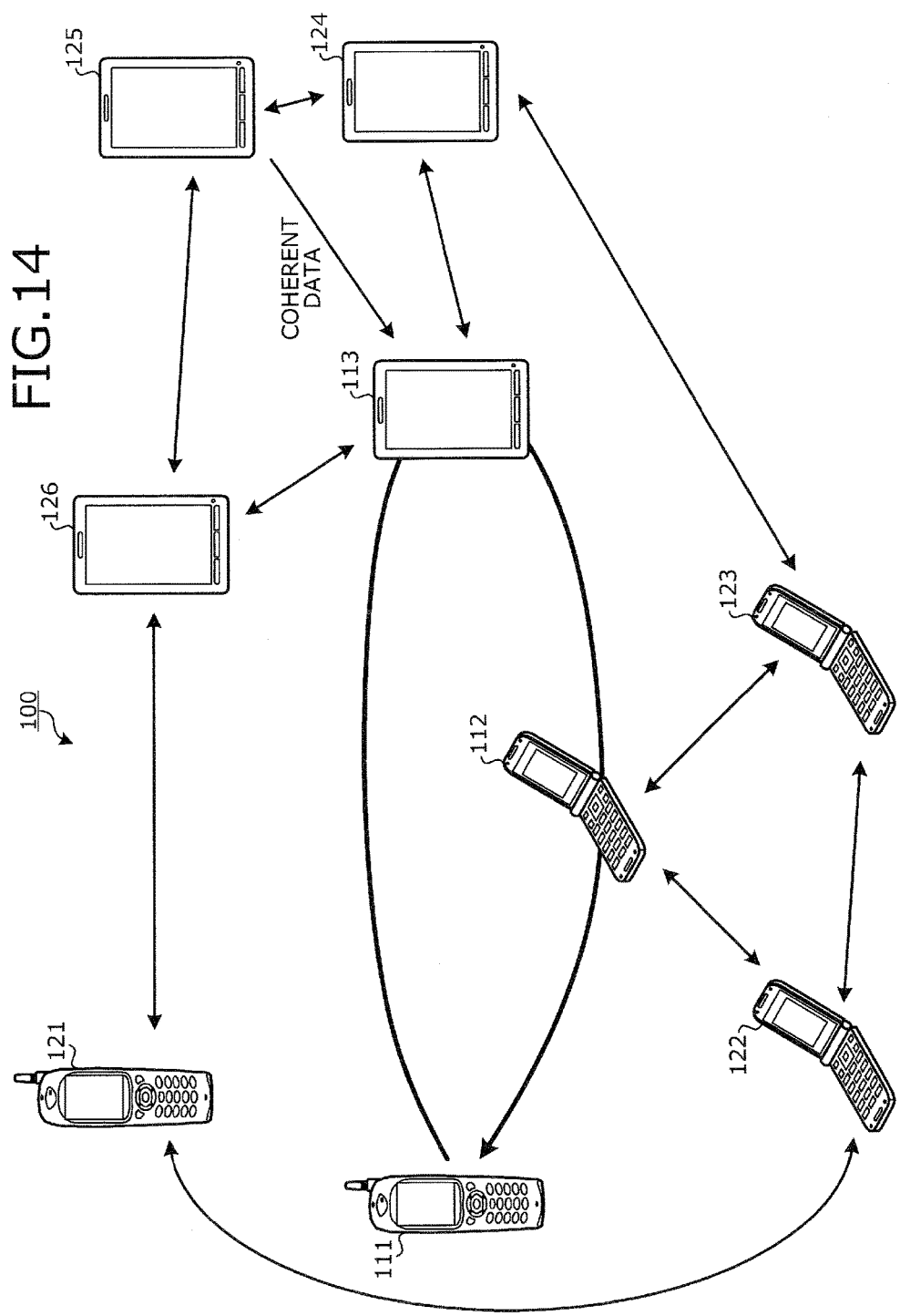
FIG. 14 is a diagram depicting one example of transmission of the coherent data from the support terminal to the group processing terminal.

FIG. 14 depicts one example of the transmission of the coherent data from the support terminal to the group processing terminal. In FIG. 14, parts identical to those depicted in FIG. 5 are given the same reference numerals used in FIG. 5, and the description thereof is omitted. As depicted in FIG. 14, the support terminals 124 to 126 that have received the transmission request signal from the group processing terminal 113, if capable of transmitting the coherent data to the group processing terminal 113, transmit the coherent data to the group processing terminal 113.

The coherent data to be transmitted to the group processing terminal 113 is the coherent data that is to be received by the group processing terminal 113 and that was shared among the support terminals 121 to 126 (see, e.g., FIG. 12). The example depicted in FIG. 14 assumes that the support terminal 125 transmits the coherent data to the group processing terminal 113. This enables the group processing terminal 113 to receive the coherent data transmitted from the group processing terminal 111.

The group processing terminal 111, without stopping the processing until the group processing terminal 113 becomes capable of receiving the coherent data, can transition to next process by transmitting to the support terminal group, the coherent data to be received by the group processing terminal 113.

Thus, the support terminal 125 (second data processing device) transmits the data to the group processing terminal 113, based on the data transmission request to the support terminal 125 from the group processing terminal 113 (first data processing device).

As depicted in FIGS. 1 to 14, in the communication system 100, the group processing terminals 111 to 113 performing the group processing request the support terminals 121 to 126 to receive the coherent data as proxies beforehand. The group processing terminals 111 to 113, when incapable of receiving the data due to another task, etc., have the data received by the support terminals 121 to 126. The group processing terminals 111 to 113, when becoming capable of receiving the coherent data, receive the coherent data from the support terminals 121 to 126.

FIG. 15A is a reference diagram of one example of operation of the communication system on the assumption that the support terminals are not used. In FIG. 15A, the horizontal axis represents time. When it is assumed that the support terminals 121 to 126 are not used, the group processing terminals 111 to 113 of the communication system 100 operate, for example, as depicted in FIG. 15A. At time t1, the group processing terminal 111 transmits a reception request signal to the group processing terminals 112 and 113.

In response, the group processing terminal 112, which is in the state of being capable of receiving the coherent data, transmits at time t2, an ACK in response to the reception request signal to the group processing terminal 111. On the other hand, it is assumed that the group processing terminal 113, which is in the midst of processing of a task of a priority higher than that of the group processing, does not transmit an ACK in response to the reception request signal.

Consequent to receiving the ACK from the group processing terminal 112, the group processing terminal 111 transmits the coherent data to the group processing terminal 112 at time t3. Consequent to receiving no ACK from the group processing terminal 113 after waiting for a given period, the group processing terminal 111 does not transmit the coherent data to the group processing terminal 113 and waits until an ACK is received from the group processing terminal 113.

At time t4, the group processing terminal 113 becomes capable of receiving the coherent data and transmits to the group processing terminal 111, an ACK in response to the reception request signal. Consequent to receiving an ACK from the group processing terminal 113, the group processing terminal 111 transmits the coherent data to the group processing terminal 113 at time t5.

Therefore, the group processing terminal 111 cannot perform the next process until time t5 when the group processing terminal 111 receives the ACK from the group processing terminal 113 and transmits the coherent data to the group processing terminal 113.

FIG. 15B depicts one example of the communication system using the support terminals. In FIG. 15B, the operation until time t1 and time t2 is the same as that depicted in FIG. 15A. It is assumed, however, that the support terminal group information is already shared by the group processing terminals 111 to 113 and the support terminals 121 to 126.

In the communication system 100 using the support terminals 121 to 126, at time t3 depicted in FIG. 15B, consequent to receiving no ACK from the group processing terminal 113, the group processing terminal 111 transmits a reception request signal to, for example, the support terminal 125.

In response, the support terminal 125, which is in a state of being capable of receiving the coherent data, at time t4 depicted in FIG. 15B, transmits to the group processing terminal 111, an ACK in response to the reception request signal. Consequent to receiving an ACK from the support terminal 125, the group processing terminal 111 transmits the coherent data to the support terminal 125 at time t5 depicted in FIG. 15B.

Consequent to becoming capable of receiving the coherent data and having received no reception request signal from the group processing terminal 111 after waiting for a given period, at time t6, the group processing terminal 113 transmits a transmission request signal to the support terminal 125. At time t7, the support terminal 125 transmits the coherent data received by proxy from the group processing terminal 111 to the group processing terminal 113.

Therefore, after time t5 at which the coherent data is transmitted to the support terminal 125, the group processing terminal 111 does not have to wait for the reception of an ACK from the group processing terminal 113 or transmit the coherent data to the group processing terminal 113. This enables the group processing terminal 111 to transition to the next process after time t5, thereby enabling reduction of the delay of the processing by the group processing terminal 111 resulting from the delay of the broadcast communication, whereby the delay of the group processing is reduced.

Figure 16A:
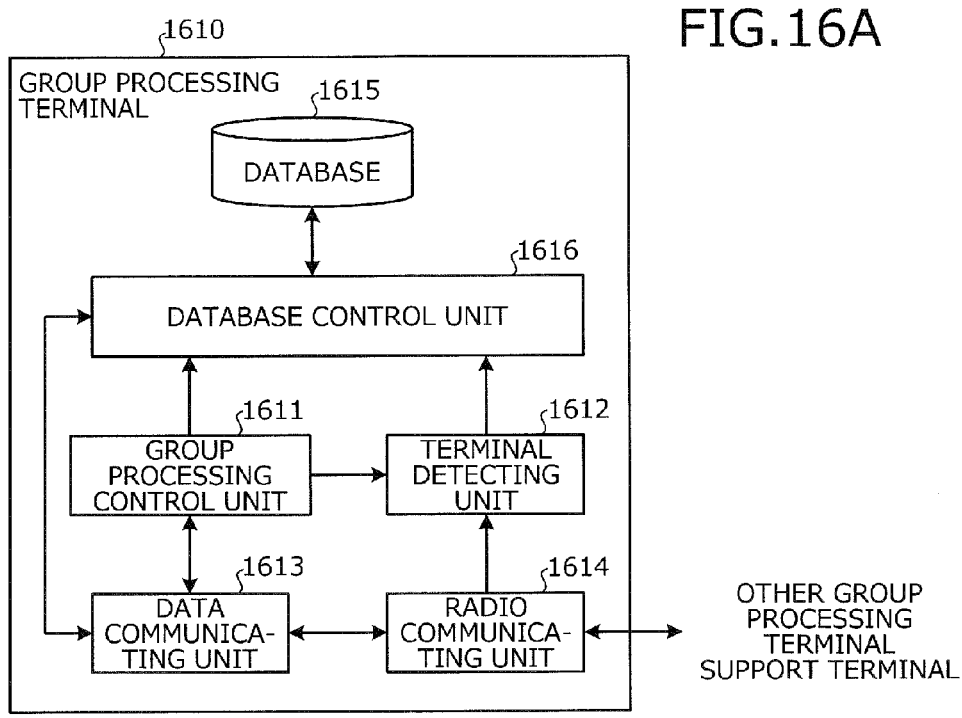
FIG. 16A is a diagram depicting one example of a functional configuration of the group processing terminal.

FIG. 16A depicts one example of a functional configuration of the group processing terminal. A group processing terminal 1610 depicted in FIG. 16A can be applied to, for example, the group processing terminals 111 to 113. As depicted in FIG. 16A, the group processing terminal 1610 has, for example, a group processing control unit 1611, a terminal detecting unit 1612, a data communicating unit 1613, a radio communicating unit 1614, a database 1615, and a database control unit 1616.

The group processing control unit 1611 is a task control unit that transmits a task to at least one support terminal (second data processing device) when the data is transmitted to the support terminals 121 to 126 (second data processing devices). For example, the group processing control unit 1611 requests the terminal detecting unit 1612 to perform terminal detection at the start of the group processing. When a group processing task occurs, the group processing control unit 1611, by way of the data communicating unit 1613, transmits the communication proxy task and the support terminal group information included in the database 1615 to the support terminals connected to the terminal, among the support terminal group.

The group processing control unit 1611, by way of the data communicating unit 1613, transmits and receives the reception request signal with respect to other group processing terminals. The group processing control unit 1611, by way of the data communicating unit 1613, transmits and receives the coherent data with respect to other group processing terminals. The group processing control unit 1611, by way of the data communicating unit 1613, transmits the transmission request signal to the support terminals connected to the terminal, among the support terminal group.

The terminal detecting unit 1612, when requested by the group processing control unit 1611 to perform terminal detection, detects as the support terminals and by way of the radio communicating unit 1614, surrounding terminals connected to the terminal. The terminal detecting unit 1612 outputs to the database control unit 1616, connected terminal information (e.g., terminal ID) that indicates the detected support terminals.

The data communicating unit 1613 is the data communicating unit that receives the first reception request for the data to the group processing terminals 111 to 113 (plural data processing devices). For example, the data communicating unit 1613, by way of the radio communicating unit 1614, performs the data communication with the terminals connected to the group processing terminal 1610. The terminals connected to the group processing terminal 1610 include the group processing terminals other than the terminal among the group processing terminals 111 to 113 and the support terminals connected to the terminal among the support terminals 121 to 126. The radio communicating unit 1614 performs radio communication with the terminals connected to the group processing terminal 1610.

The database 1615 is the database that includes the support terminal group information. The database control unit 1616 is the database control unit that registers at least one support terminal (second data processing device) capable of communicating with the group processing terminal (first data processing device) among the group processing terminals 111 to 113 (plural data processing devices) as a group in the database 1616 (memory). For example, the database control unit 1616 adds the support terminals indicated by the connected terminal information output from the terminal detecting unit 1612 to the support terminal group information of the database 1615 as the support terminals connected to the terminal.

The database control unit 1616 transmits, by way of the radio communicating unit 1614, the connected terminal information output from the terminal detecting unit 1612 to other group processing terminals. The database control unit 1616, by way of the data communicating unit 1613, acquires the connected terminal information transmitted from other group processing terminals and adds the support terminals indicated by the acquired connected terminal information to the support terminal group information of the database 1615. This makes it possible to share the support terminal group information with other group processing terminals.

Figure 16B:
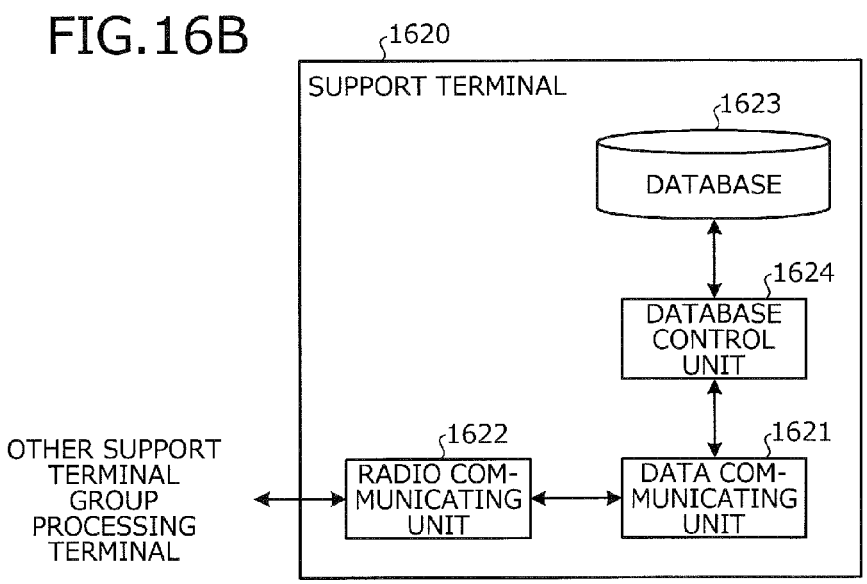
FIG. 16B is a diagram depicting one example of a functional configuration of the support terminal.

FIG. 16B depicts one example of a functional configuration of the support terminal. A support terminal 1620 depicted in FIG. 16B can be applied to, for example, the support terminals 121 to 126. As depicted in FIG. 16B, the support terminal 1620 has a data communicating unit 1621, a radio communicating unit 1622, a database 1623, and a database control unit 1624.

The data communicating unit 1621, by way of the radio communicating unit 1622, performs data communication with the terminals connected to the support terminal 1620. The terminals connected to the support terminal 1620 include the support terminals other than the terminal among the support terminals 121 to 126 and the group processing terminal connected to the terminal among the group processing terminals 111 to 113. The radio communicating unit 1622 performs radio communication with the terminals connected to the support terminal 1620.

The database 1623 is the database including, for example, the support terminal group information and the coherent data received by proxy. The database control unit 1624 performs the control of the database 1623. The database control unit 1624 performs the communication proxy process of proxying a part of the broadcast communication in the group processing terminals 111 to 113. The communication proxy process can be performed by communicating with the group processing terminals 111 to 113 and other support terminals, by way of, for example, the data communicating unit 1621.

For example, upon receiving the support terminal group information and the communication proxy task from the group processing terminal 1610, the database control unit 1624 stores the received support terminal group information and communication proxy task in the database 1623. Upon receiving the reception request signal from the group processing terminal 1610, the database control unit 1624 and if capable of receiving the coherent data, receives the coherent data from the group processing terminal 1610. The database control unit 1624 stores the received coherent data into the database 1623. Upon receiving the transmission request signal from the group processing terminal 1610, the database control unit 1624 transmits the requested coherent data to the group processing terminal 1610 if the requested coherent data is in the database 1623.

While the functional configuration of the group processing terminal 1610 and the support terminal 1620 has been described in FIG. 16A and FIG. 16B, respectively, each terminal in the communication system 100 may have the functional configuration of both of the group processing terminal 1610 and the support terminal 1620. In this case, each terminal of the communication system 100 operates as the group processing terminal 1610 or the support terminal 1620, depending on the situation.

FIG. 17 depicts one example of a hardware configuration of the group processing terminal and the support terminal. The group processing terminal 1610 and the support terminal 1620 may be implemented by, for example, a data processing device 1700 depicted in FIG. 17. The data processing device 1700 has a central processing unit (CPU) 1701, random access memory (RAM) 1702, storage 1703, and a radio unit 1704. The central processing unit 1701, the random access memory 1702, the storage 1703, and the radio unit 1704 are interconnected by a bus 1720.

The central processing unit 1701 governs overall control of the data processing device 1700. The random access memory 1702 stores programs such as a boot program (e.g., operating system), the database, etc. The random access memory 1702 is used as a work area of the central processing unit 1701. The storage 1703 is auxiliary memory that stores data under the control of the central processing unit 1701. The radio unit 1704 performs communication with other terminals through a radio communication line. The radio unit 1704 is, for example, a wireless LAN adaptor, etc.

The group processing control unit 1611, the terminal detecting unit 1612, the data communicating unit 1613, and the database control unit 1616 of the group processing terminal 1610 may be implemented by, for example, a function of the operating system to be executed by the central processing unit 1701. The radio communicating unit may be implemented by, for example, the radio unit 1704. The database 1615 may be implemented by, for example, the random access memory 1702 or the storage 1703.

The data communicating unit 1621 and the database control unit 1624 of the support terminal 1620 may be implemented by, for example, a function of the operating system to be executed by the central processing unit 1701. The radio communicating unit 1622 may be implemented by, for example, the radio unit 1704. The database 1623 may be implemented by, for example, the random access memory 1702 or the storage 1703.

Figure 18:
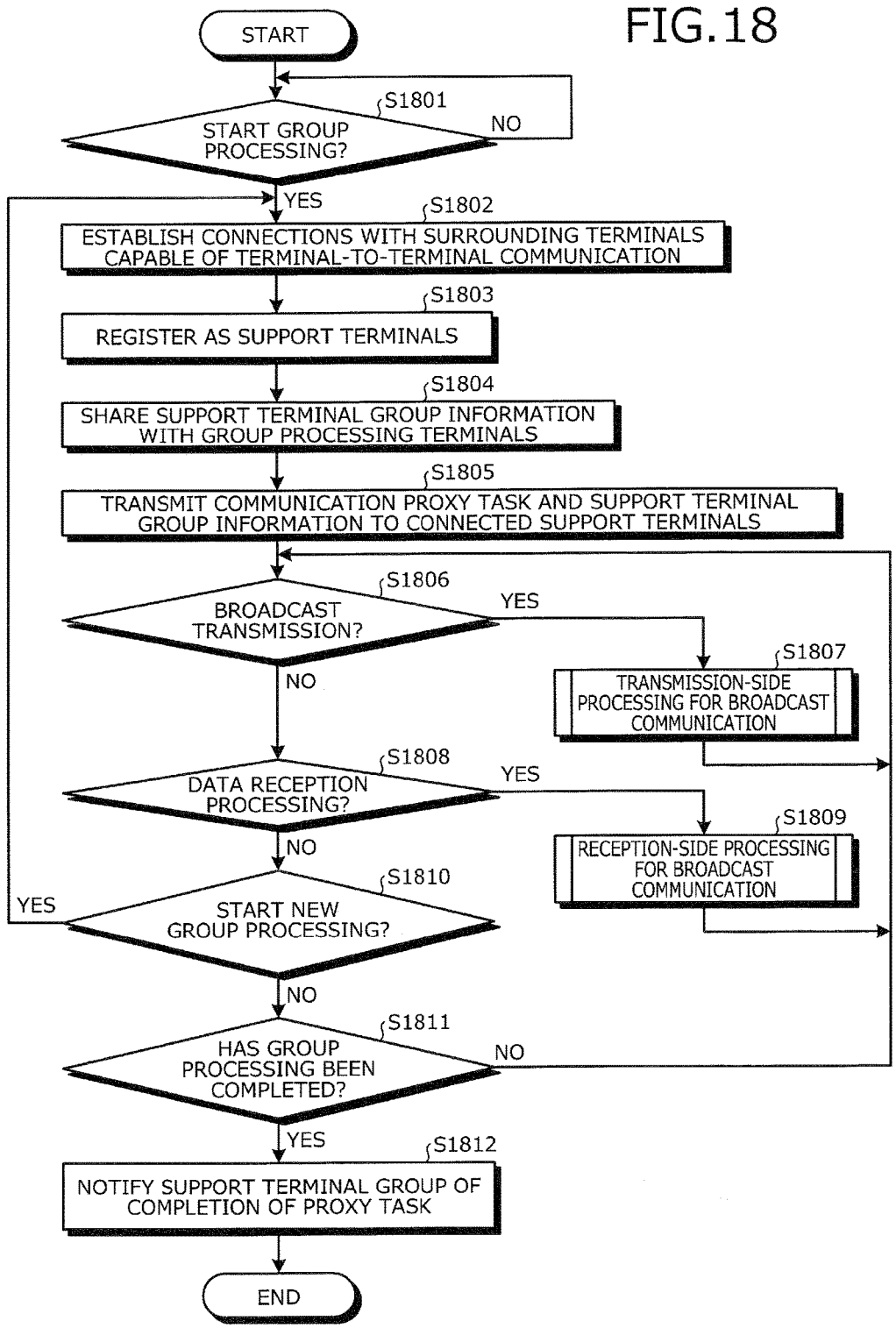
FIG. 18 is a flowchart of one example of processing by the group processing terminal.

FIG. 18 is a flowchart of one example of processing by the group processing terminal. The group processing terminal 1610 repeatedly executes the operations, for example, depicted in FIG. 18. The group processing control unit 1611 determines whether to start the group processing (step S1801) and waits until the group processing is to be started (step S1801: NO). When the group processing is to be started (step S1801: YES), the data communicating unit 1613, by way of the radio communicating unit 1614, establishes connections with surrounding terminals capable of terminal-to-terminal communication (step S1802).

The database control unit 1616 registers the terminals connected at step S1802 as support terminals in the support terminal group information of the database 1615 (step S1803). The database control unit 1616, by performing the communication by way of the radio communicating unit 1614, shares the support terminal group information with group processing terminals excluding the terminal 1610 among the group processing terminals 111 to 113 (step S1804).

The group processing control unit 1611, by way of the data communicating unit 1613, transmits the communication proxy task and the support terminal group information to the support terminals connected at step S1802 (step S1805). The group processing control unit 1611 determines whether broadcast transmission has occurred (step S1806).

At step S1806, if broadcast transmission has occurred (step S1806: YES), the group processing terminal 1610 executes transmission-side processing for broadcast communication (step S1807) and returns to step S1806. The transmission-side processing for broadcast communication will be described by FIG. 19. If no broadcast transmission has occurred (step S1806: NO), the group processing control unit 1611 determines whether data reception processing has occurred (step S1808).

At step S1808, if data reception processing has occurred (step S1808: YES), the group processing terminal 1610 executes reception-side processing for broadcast communication (step S1809) and returns to step S1806. The reception-side processing for broadcast communication will be described by FIG. 20. If no data reception processing has occurred (step S1808: NO), the group processing control unit 1611 determines whether to start new group processing (step S1810).

At step S1810, in the case of starting new group processing (step S1810: YES), the group processing terminal 1610 returns to step S1802 and newly establishes connections with other connectable support terminals. In the case of not starting new group processing (step S1810: NO), the group processing control unit 1611 determines whether the group processing under execution has been completed (step S1811).

At step S1811, if the group processing under execution has not been completed (step S1811: NO), the group processing terminal 1610 returns to step S1806. If the group processing under execution has been completed (step S1811: YES), the group processing control unit 1611, by way of the data communicating unit 1613, notifies the support terminal group of the completion of the proxy task (step S1812), completing a sequence of the processing.

By the above operations, the group processing terminal 1610, in the case of the group processing, can establish connections with the support terminal group to share the support terminal group information as well as perform broadcast communication.

Figure 19:
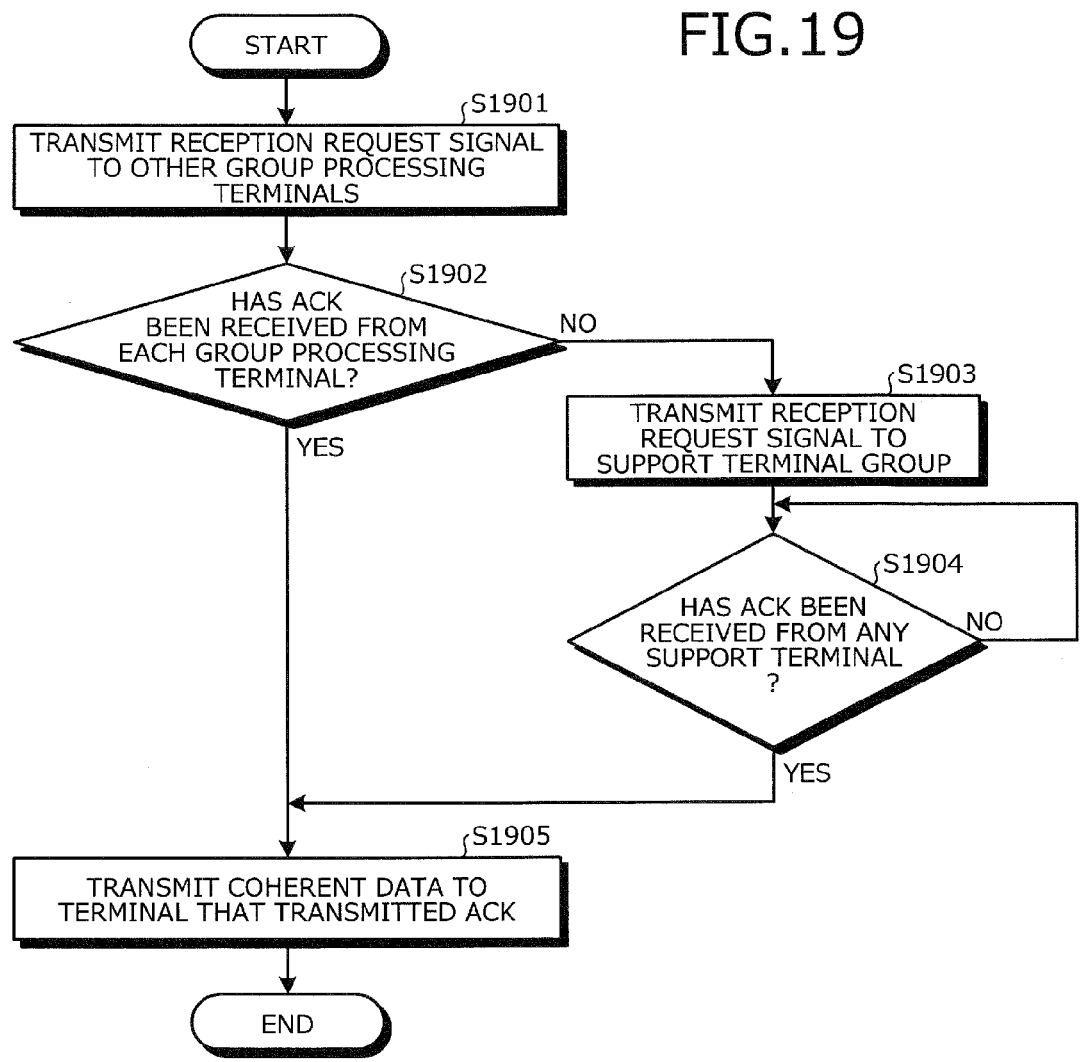
FIG. 19 is a flowchart of one example of a transmission-side process for broadcast communication by the group processing terminal.

FIG. 19 is a flowchart of one example of the transmission-side process for broadcast communication by the group processing terminal. The group processing terminal 1610 executes, for example, the following operations at step S1807 depicted in FIG. 18. The group processing control unit 1611, by way of the data communicating unit 1613, transmits a reception request signal to the group processing terminals other than the terminal 1610 among the group processing terminals 111 to 113 (step S1901).

The group processing control unit 1611 determines whether an ACK has been received from each group processing terminal to which the reception request signal has been transmitted by step S1901 (step S1902). If an ACK has been received from each group processing terminal to which the reception request signal has been transmitted by step S1901 (step S1902: YES), the group processing terminal 1610 transitions to step S1905.

At step S1902, if an ACK has not been received from each the group processing terminals to which the reception request signal has been transmitted by step S1901 (step S1902: NO), the group processing terminal 1610 transitions to step S1903. Namely, the group processing control unit 1611, by way of the data communicating unit 1613, transmits a reception request signal to the support terminal group (step S1903).

The group processing control unit 1611 determines whether an ACK has been received from any of the support terminal group to which the reception request signal has been transmitted at step S1903 (step S1904). The group processing control unit 1611 waits until an ACK has been received from any support terminal of the support terminal group (step S1904: NO). At step S1904, configuration may be such that if no ACK is received after waiting for a given period, the group processing terminal 1610 transitions to step S1905.

At step S1904, when an ACK is received from any support terminal of the support terminal group (step S1904: YES), the group processing terminal 1610 transitions to step S1905. Namely, the group processing control unit 1611, by way of the data communicating unit 1613, transmits the coherent data to the terminal that transmitted the ACK in response to the reception request signal (step S1905), completing a sequence of the processing.

The terminals which transmit the ACK include the group processing terminal from which the ACK is received at step S1902 and the support terminal from which the ACK is received at step S1904. By the above operations, the group processing terminal 1610 can transmit the coherent data to a group processing terminal capable of reception among the other group processing terminals. If there is a group processing terminal incapable of reception among the other group processing terminals, the group processing terminal 1610 can transmit the coherent data to the support terminal group.

Figure 20:
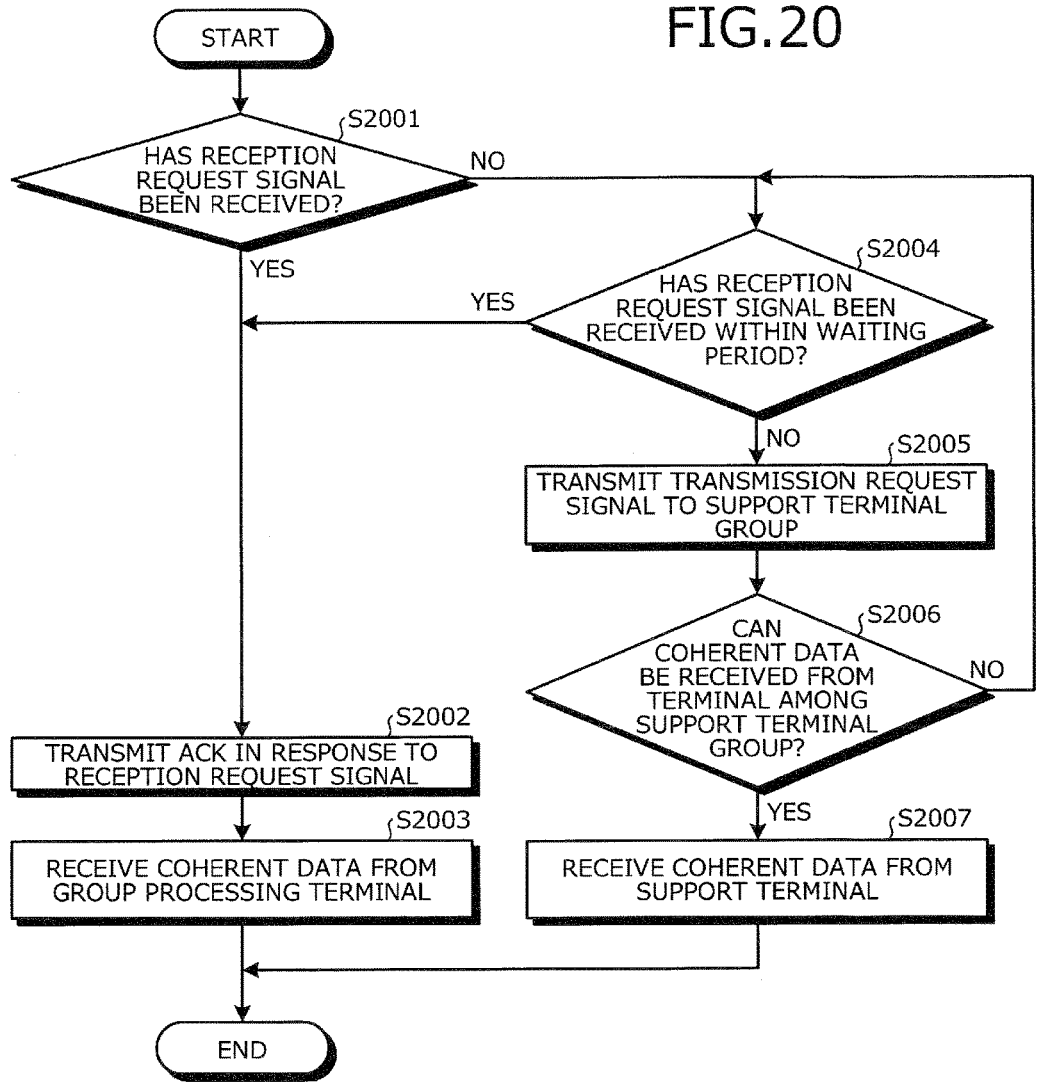
FIG. 20 is a flowchart of one example of a reception-side process for broadcast communication by the group processing terminal.

FIG. 20 is a flowchart of one example of the reception-side process for broadcast communication by the group processing terminal. The group processing terminal 1610 executes, for example, the following operations at step S1809 depicted in FIG. 18. The group processing control unit 1611, by way of the data communicating unit 1613, determines whether a reception request signal has been received from a group processing terminal other than the terminal 1610 among the group processing terminals 111 to 113 (step S2001).

At step S2001, if a reception request signal has been received (step S2001: YES), the data communicating unit 1613 transmits to the group processing terminal that transmitted the reception request signal, an ACK in response to the reception request signal (step S2002). The data communicating unit 1613 receives the coherent data from the group processing terminal that transmitted the reception request signal (step S2003), completing a sequence of the processing.

At step S2001, if no reception request signal has been received (step S2001: NO), the group processing terminal 1610 transitions to step S2004. Namely, the group processing control unit 1611 waits for a given period and determines whether a reception request signal has been received from another group processing terminal within the waiting period (step S2004).

At step S2004, if a reception request signal has been received (step S2004: YES), the group processing terminal 1610 transitions to step S2002. If no reception request signal has been received (step S2004: NO), the group processing control unit 1611, by way of the data communicating unit 1613, transmits a transmission request signal to the support terminal group (step S2005).

The group processing control unit 1611 determines whether the coherent data can be received from any terminal of the support terminal group to which the transmission request signal has been transmitted at step S2005 (step S2006). If the coherent data cannot be received from any terminal of the support terminal group (step S2006: NO), the group processing terminal 1610 transitions to step S2004.

At step S2006, if the coherent data can be received from a terminal of the support terminal group (step S2006: YES), the group processing terminal 1610 receives the coherent data from the support terminal (step S2007), completing a sequence of the processing. By the above operations, the group processing terminal 1610 can receive the coherent data transmitted from other group processing terminal to the terminal 1610, from the group processing terminal that transmitted the coherent data or from any terminal of the support terminal group.

Figure 21:
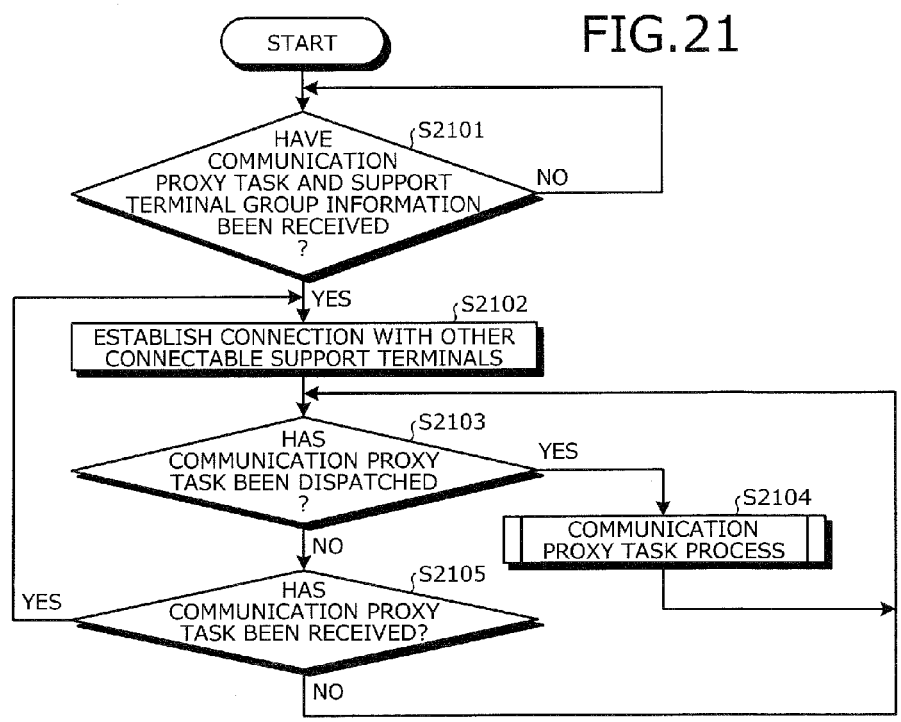
FIG. 21 is a flowchart of one example of processing by the support terminal.

FIG. 21 is a flowchart of one example of processing by the support terminal. The support terminal 1620 executes, for example, the operations depicted in FIG. 21. The database control unit 1624, by way of the data communicating unit 1621, determines whether the communication proxy task and the support terminal group information have been received from the group processing terminal 1610 (step S2101) and waits until the reception thereof (step S2101: NO).

At step S2101, when the communication proxy task and the support terminal group information are received (step S2101: YES), the data communicating unit 1621 establishes a connection with other connectable support terminals (step S2102). Other connectable support terminals are the connectable support terminals, among the support terminal group excluding the terminal 1620, indicated by the support terminal group information received at step S2101.

The database control unit 1624 determines whether the communication proxy task that is received at step S2101 has been dispatched (step S2103). If the communication proxy task has been dispatched (step S2103: YES), the support terminal 1620 executes communication proxy task process (step S2104) and returns to step S2103. The communication proxy task process will be described in FIG. 22.

At step S2103, if the communication proxy task has not been dispatched (step S2103: NO), the database control unit 1624, by way of the data communicating unit 1621, determines whether another communication proxy task and support terminal group information have been received from the group processing terminal 1610 (step S2105). If a communication proxy task and support terminal group information have been received (step S2105: YES), the support terminal 1620 returns to step S2102 and newly connects with other connectable support terminals.

At step S2105, if no communication proxy task or support terminal group information has been received (step S2105: NO), the support terminal 1620 returns to step S2103. The above operations enable the support terminal 1620 to establish connections with other support terminals as well as perform the communication proxy process (see, e.g., FIG. 22) when the communication proxy task and the support terminal group information are received from the group processing terminal 1610.

Figure 22:
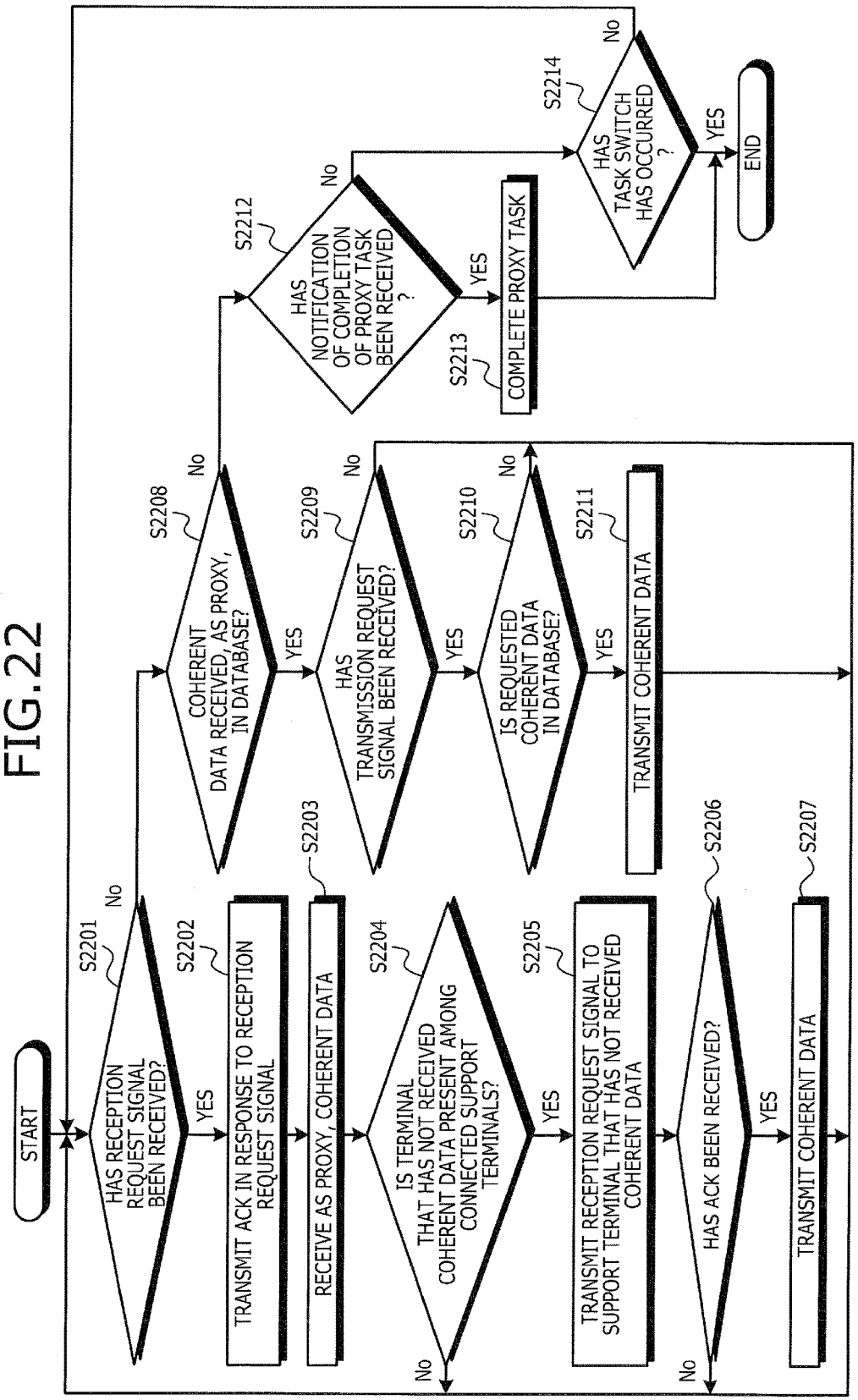
FIG. 22 is a flowchart of one example of a communication proxy task process by the support terminal.

FIG. 22 is a flowchart of one example of the communication proxy task process by the support terminal. The support terminal 1620 executes, for example, the following operations at step S2104 depicted in FIG. 21. The database control unit 1624, by way of the data communicating unit 1621, determines whether a reception request signal requesting reception of the coherent data as a proxy has been received from the group processing terminal 1610 (step S2201).

At step S2201, if a reception request signal has been received (step S2201: YES), the database control unit 1624, by way of the data communicating unit 1621, transmits an ACK in response to the received reception request signal (step S2202).

The database control unit 1624, by way of the data communicating unit 1621, receives as a proxy, the coherent data from the group processing terminal 1610 that transmitted the reception request signal (step S2203). The database control unit 1624 stores into the database 1615, the coherent data received as a proxy.

At step S2203, the database control unit 1624 determines whether there is a support terminal that has not received the coherent data among the connected support terminals, among the support terminals indicated by the support terminal group information (step S2204). Whether each of the other support terminals has received the coherent data can be determined, for example, by inquiring of each of the support terminals.

At step S2204, if each support terminal has received the coherent data among the connected support terminals (step S2204: NO), the support terminal 1620 returns to step S2201. If there is a support terminal that has not received the coherent data among the connected support terminals (step S2204: YES), the database control unit 1624, by way of the data communicating unit 1621, transmits a reception request signal to the support terminal that has not received the coherent data (step S2205).

The database control unit 1624, by way of the data communicating unit 1621, determines whether an ACK has been received in response to the reception request signal transmitted at step S2205 (step S2206). If no ACK has been received in response to the reception request signal (step S2206: NO), the support terminal 1620 returns to step S2201.

At step S2206, if an ACK has been received in response to the reception request signal (step S2206: YES), the support terminal 1620 transitions to step S2207. Namely, the database control unit 1624, by way of the data communicating unit 1621, transmits the coherent data received at step S2203 to the support terminal that transmitted the ACK (step S2207) and returns to step S2201.

At step S2201, if the reception request signal is not received from the group processing terminal 1610 (step S2201: NO), then the support terminal 1620 transitions to step S2208. Namely, the database control unit 1624 determines whether in the database 1623, there is the coherent data received by the terminal as a proxy (step S2208).

At step S2208, if there is coherent data received as a proxy (step S2208: YES), then the database control unit 1624 determines whether a transmission request signal has been received from the group processing terminal 1610 (step S2209). If a transmission request signal has not been received (step S2209: NO), the support terminal 1620 returns to step S2201.

At step S2209, if a transmission request signal has been received (step S2209: YES), the database control unit 1624 determines whether coherent data requested by the transmission request signal is in the database 1623 (step S2210). If there is the requested coherent data is not in the database 1623 (step S2210: NO), the support terminal 1620 returns to step S2201.

At step S2210, if the requested coherent data is in the database 1623 (step S2210: YES), the support terminal 1620 transitions to step S2211. Namely, the database control unit 1624, by way of the data communicating unit 1621, transmits the requested coherent data to the group processing terminal 1610 that transmitted the transmission request signal (step S2211) and returns to step S2201.

At step S2208, if there is no coherent data received as a proxy (step S2208: NO), the support terminal 1620 transitions to step S2212. Namely, the database control unit 1624, by way of the data communicating unit 1621, determines whether notification of completion of the proxy task has been received from the group processing terminal 1610 (step S2212).

At step S2212, if notification of the completion of the proxy task has been received from the group processing terminal 1610 (step S2212: YES), the database control unit 1624 completes the proxy task (step S2213), completing a sequence of the processing. At step S2213, configuration may be such that the database control unit 1624 removes the coherent data relevant to the completed proxy task from the database 1623.

At step S2212, if notification of the completion of the proxy task has not been received (step S2212: NO), the database control unit 1624 determines whether a task switch has occurred that terminates the task of the communication proxy process (step S2214). If no task switch has occurred that terminates the task of the communication proxy process (step S2214: NO), the support terminal 1620 returns to step S2201.

At step S2214, if a task switch has occurred that terminates the task of the communication proxy process (step S2214: YES), the support terminal 1620 completes a sequence of the processing. By the above operations, the support terminal 1620, in the case of reception of the reception request signal from the group processing terminal 1610, can receive by proxy the coherent data from the group processing terminal 1610. When the received coherent data is requested by another group processing terminal 1610, the support terminal 1620 can transmit the received coherent data to the group processing terminal 1610 that requested the coherent data.

As described, according to the data communication method and the data communication system, the data to the group processing terminal 113 (first terminal) that cannot immediately receive the data can be received by proxy by the support terminal 121 to 126 (second terminal). With the support terminal 121 to 126 (second terminal) transmitting the data to the group processing terminal 113 (first terminal) later, delay of broadcast communication can be prevented and the time can be shortened for the data coherency process, thereby enabling efficient group processing.

Although, in the embodiment described above, a case has been described in which the group processing terminals 111 to 113 perform the data coherency process and transmit and receive the coherent data, the present embodiment may be applied not only to a case of performing the data coherency process. For example, the present embodiment can be applied to a communication system in general in which data is transmitted and received by broadcast between the terminals.

Although, in the embodiment described above, a case has been described in which the terminals 111 to 113 operate as group processing terminals and the terminals 121 to 126 operate as support terminals, the terminals 111 to 113 may operate as support terminals as well. For example, the data that is to be transmitted to the terminal 113 may be received by the terminal 112 as the support terminal (proxy) and may be shared among the terminal 112 and the terminals 121 to 126.

According to an aspect of the embodiment, efficient group processing is enabled.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data communication method for one of a plurality of data processing devices that include a first data processing device, comprising:
    registering as a group, one or more second data processing devices capable of communicating with at least one of the plurality of data processing devices;
    transmitting to the plurality of data processing devices, a first reception request for data;
    transmitting to at least one second data processing device that is among the one or more second data processing devices and capable of communicating with the first data processing device, a second reception request for the data as a result of not receiving a response to the first reception request from the first data processing device;
    transmitting the data to the at least one second data processing device based on a response from the at least one second data processing device; and
    sharing terminal information that indicates each registered second data processing device, the terminal information being shared among the plurality of data processing devices by each of the plurality of data processing devices transmitting and receiving information indicating each second data processing device with which each of the plurality of data processing devices can communicate and that receives the data as a proxy, wherein
    the transmitting of the second reception request includes transmitting the second reception request to the at least one second data processing device, based on the shared terminal information.

2. The data communication method according to claim 1, wherein
    the transmitting of the first reception request for the data to the plurality of data processing devices includes transmitting the first reception request when broadcast communication is performed among the plurality of data processing devices.

3. The data communication method according to claim 1, further comprising
    transmitting the data to the first data processing device, by the at least one second data processing device and based on a transmission request that is for the data and from the first data processing device to the at least one second data processing device.

4. The data communication method according to claim 1, further comprising
transmitting the data by a given second data processing device to which the data has been transmitted, wherein the data is transmitted by the given second data processing device to a second data processing device excluding the given second processing device, when a plurality of second data processing devices are registered as the group.

5. The data communication method according to claim 1, further comprising
transmitting the terminal information by the plurality of data processing devices and to the one or more second data processing devices; and
transmitting the data by a given second data processing device to which the data has been transmitted, wherein the data is transmitted by the given second data processing device to a second data processing device excluding the given second data processing device, when a plurality of second data processing devices are registered as the group.

6. A data communication system comprising:
a memory; and
a first data processing device that is included in a plurality of data processing devices and configured to:
register as a group into the memory, one or more second data processing devices capable of communicating with at least one of the plurality of data processing devices,
receive a first reception request that is for data and to the plurality of data processing devices;
transmit a task to at least one second data processing device among the one or more second data processing devices, when the data is transmitted to the at least one second data processing device and as a result of not receiving a response to the first reception request from the first processing device; and
share terminal information that indicates each registered second data processing device, the terminal information being shared among the plurality of data processing devices by each of the plurality of data processing devices transmitting and receiving information indicating each second data processing device with which each of the plurality of data processing devices can communicate and that receives the data as a proxy, wherein
the second reception request is transmitted to the at least one second data processing device based on the shared terminal information.

7. The data communication system according to claim 6, wherein
when there is a plurality of second data processing devices registered as the group, the task is an instruction to share the data among the one or more second data processing devices.

8. The data communication system according to claim 6, wherein
the first reception request for the data is transmitted to the plurality of data processing devices when broadcast communication is performed among the plurality of data processing devices.

* * * * *